US012640468B2

(12) United States Patent
Oberman et al.

(10) Patent No.: US 12,640,468 B2
(45) Date of Patent: *May 26, 2026

(54) LOW-PIM CELLULAR BASE STATION ANTENNA CONCEALMENTS UTILIZING LOW-PIM FASTENERS

(71) Applicant: Valmont Industries, Inc., Tucson, AZ (US)

(72) Inventors: Alexander Oberman, Tucson, AZ (US); Mark R. Schmidt, Tubac, AZ (US)

(73) Assignee: VALMONT INDUSTRIES, INC., Tucson, AZ (US)

( * ) Notice: Subject to any disclaimer, the term of this patent is extended or adjusted under 35 U.S.C. 154(b) by 149 days.

This patent is subject to a terminal disclaimer.

(21) Appl. No.: 18/629,935

(22) Filed: Apr. 9, 2024

(65) Prior Publication Data

US 2025/0112362 A1 Apr. 3, 2025

Related U.S. Application Data

(63) Continuation-in-part of application No. 18/479,209, filed on Oct. 2, 2023, now Pat. No. 11,955,700.

(51) Int. Cl.

*H01Q 1/44* (2006.01)
*H01Q 1/24* (2006.01)

(52) U.S. Cl.

CPC ............... *H01Q 1/44* (2013.01); *H01Q 1/246* (2013.01)

(58) Field of Classification Search

CPC ............. H01Q 1/44; H01Q 1/246; H01Q 1/24
See application file for complete search history.

*Primary Examiner* — Hai V Tran
(74) *Attorney, Agent, or Firm* — Mehrman Law Office; Michael J. Mehrman

(57) ABSTRACT

Cellular base station antenna concealments, such as palm and tree concealments, utilize artificial branches with non-metallic (e.g., polymeric) fasteners to avoid loose metal-to-metal connections to mitigate the generation of passive intermodulation (PIM) interference by the branches. Representative embodiments include "palm concealments" with low-PIM artificial palm fronds, and "tree concealments" with low-PIM artificial tree branches. That is, "low-PIM fronds" and "low-PIM tree branches" are two representative examples of "low-PIM branches" illustrating representative embodiments of the invention. The low-PIM palm frond includes a nonmetallic (e.g., polymeric) fasteners and sleeve positioned between a metal frond shaft and a metal frond receiver. The low-PIM tree branch includes nonmetallic (e.g., polymeric) fasteners as the only low-PIM isolators added to conventional tree branch assemblies to avoid PIM generation by the tree branch assembly.

21 Claims, 27 Drawing Sheets

LOW-PIM CELLULAR BASE STATION ANTENNA CONCEALMENTS UTILIZING LOW-PIM FASTENERS

REFERENCE TO RELATED APPLICATIONS

This is a continuation-in-part claiming filing priority to U.S. patent application Ser. No. 18/479,209 filed Oct. 2, 2023 granted as U.S. Pat. No. 11,955,700 issued Apr. 9, 2024.

TECHNICAL FIELD

The present invention is directed to cellular communication systems and, more particularly, to base station antenna concealments, such as palm and tree concealments, configured to mitigate passive intermodulation ("PIM") interference.

BACKGROUND

An essential element of modern mobile communications systems is the "cell site." The cell site includes one or more cellular base station antennas aimed at a desired geographical area of coverage. The performance of a cell site is often limited by passive intermodulation ("PIM") interference. PIM interference occurs when the high-power downlink signals (the "main beam") transmitted by the base station antenna mixes at passive, non-linear junctions in the RF path, creating new signals. When these new signals (intermodulation products) fall in an antenna's uplink band, they act as interference and reduce the signal-to-interference-plus-noise ratio ("SINR"). As the SINR reduces, the geographic coverage of the cell site reduces and the data capacity of that cell site is reduced.

It is well documented that loosely touching metal-to-metal surfaces can behave in a non-linear fashion and become sources of passive intermodulation when illuminated by high power RF signals. Recently, it has been determined that loose metal-to-metal connections located behind or to the side of base station antennas are also able to generate high levels of passive intermodulation. Even though these regions may be well outside the main beam of the antenna, enough RF energy is present to excite non-linear objects and generate PIM. Based on field measurements, it has been determined that loose metal-to-metal contacts located very close to base station antennas (e.g., within one main beam wavelength) are more likely to generate high levels of PIM than loose metal-to-metal contacts located farther away (e.g., greater than one main beam wavelength) from the base station antenna.

In some geographic locations, governing jurisdictions require base station antennas to be concealed to improve aesthetics. Mobile wireless installations have been disguised in various ways including artificial trees (e.g., pine, elm, eucalyptus, and palm), so the cell site will blend into the surrounding environment. When a cellular installation is concealed as a tree it normally consists of a steel base pole that is bolted, using structural anchor bolts, to a concrete foundation. Depending on the style of concealment structure, the steel base pole has galvanized nuts, steel tubes, or steel pipes that are welded directly to the base pole forming a receiver for the concealment tree branches, such as artificial palm fronds or other tree branches. The type of tree branches and the branch layout typically depends on the equipment configuration and customer specification, but each site is generally fabricated to mimic trees prevalent in the natural environment of the installation location. On all cell sites, some or all of the artificial tree branches are necessarily in close proximity to the base station antenna to conceal the antenna.

SUMMARY

The present invention includes the discovery that conventional techniques for attaching the artificial concealment branches to the metal branch receivers extending form the mounting structures (e.g., steel monopoles) often include loose metal-to-metal connections creating PIM adversely impacting the performance of the concealed base-station antenna. The present invention mitigates this problem through low-PIM cellular base station antenna concealments utilizing low-PIM (e.g., nonmetallic, polymeric) fasteners between the metal branch receivers and the fasteners attaching the branches to the branch receivers to avoid loose metal-to-metal connections in the concealments to mitigate PIM generation. Embodiments of the invention include low-PIM artificial branches, low-PIM receivers for the artificial branches, and cellular base station antennas including the low-PIM concealments. Illustrative examples of the low-PIM branches are referred to as artificial palm fronds and artificial tree branches, such as pine, elm, eucalyptus, and so forth.

In an illustrative embodiment, a cellular base station includes a mounting structure, a cellular base-station antenna supported by the mounting structure, and a concealment. The concealment includes a number of branches, such as artificial palm frond or artificial tree branch concealments. Each branch includes a branch shaft that connects to a metal branch receiver attached to a mounting structure supporting the cellular base station antenna. Each branch also includes branch foliage connected to the branch shaft and one or more low-PIM fasteners to avoid PIM generation at the junction between the fastener and the metal branch shaft and/or receiver.

In an embodiment, the branch is an artificial palm frond including palm foliage. A frond stub is received within the metal frond shaft, which is received within the metal frond receiver, which extends from the mounting structure. The low-PIM fastener may be utilized in addition to a low-PIM isolator, such as a polymeric sleeve positioned over the metal frond shaft for receipt within the metal frond receiver to insulate the metal frond shaft from the metal frond receiver.

In an alternative technique, the branch is a tree branch including a metal tree branch shaft and tree foliage directly or indirectly supported by the tree branch shaft. The metal tree branch shaft is received over the metal tree branch receiver, which extends from the mounting structure. In a first embodiment, the low-PIM isolator includes polymeric fasteners positioned in the fastener holes of the metal branch receiver to insulate the metal fasteners from the metal branch receiver. In a second embodiment, the low-PIM isolator includes a polymeric sleeve positioned over a non-threaded portion of the metal branch receiver. In this embodiment, the polymeric sleeve includes polymeric fasteners to insulate the metal fasteners from the metal branch receiver.

It will be understood that specific embodiments may include a variety of features in different combinations, as desired by different users. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

DETAILED DESCRIPTION

Figure 1:
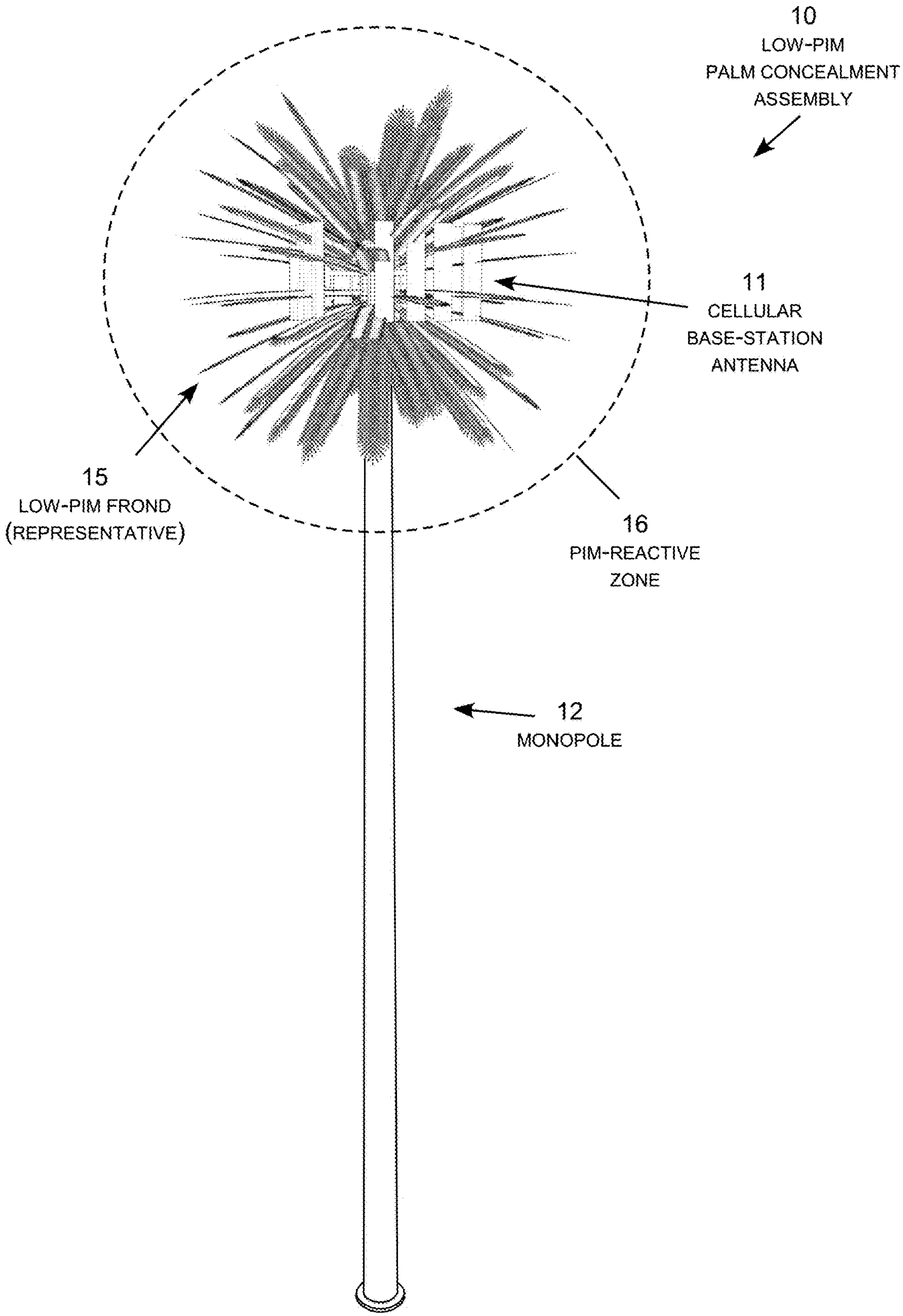
FIG. 1 is a conceptual illustration of a low-PIM palm concealment for a cellular base station antenna.

Embodiments of the invention include low-PIM concealments and cellular base station antennas utilizing the low-PIM concealments, such as palm and tree concealments. The low-PIM concealments include artificial branches, such as artificial palm fronds or tree branches, with nonmetallic (e.g., polymeric) interfaces to avoid loose metal-to-metal connections to mitigate PIM generation by the branches. While any type of concealment branch may be used, representative embodiments include "palm concealments" with low-PIM artificial palm fronds, and "tree concealments" with low-PIM artificial tree branches. That is, "low-PIM fronds" and "low-PIM tree branches" are two representative examples of "low-PIM branches" illustrating representative embodiments of the invention. The low-PIM palm frond includes a nonmetallic (e.g., polymeric) sleeve positioned between a metal frond shaft and a metal frond receiver. A first example of the low-PIM tree branch includes nonmetallic (e.g., polymeric) isolators positioned between metal fasteners and a metal tree branch receiver. A second example of the low-PIM tree branch includes a nonmetallic (e.g., polymeric) sleeve positioned between the metal tree branch receiver and a metal tree branch shaft.

Referring now to the palm concealment, the conventional artificial palm frond includes polymeric frond foliage connected to a polymeric frond stub extending from the palm foliage. The polymeric frond stub is inserted into a metal frond shaft, which is secured to the metal frond shaft with a metal fastener extending through the frond shaft and the polymeric frond stub. The frond is then installed to the mounting structure, typically a steel monopole, by sliding the metal frond shaft into a metal frond receiver welded to the mounting structure. The metal frond receiver is then attached to the metal frond shaft with one or more metal fasteners, such as bolt stacks, extending through the metal frond receiver and the metal frond shaft. During testing, the metal-to-metal interface between the metal fasteners, the metal frond shaft, and the metal frond receiver have been found to be significant sources of PIM in this type of concealment.

To mitigate PIM generation, the invention may be embodied in a low-PIM palm concealment with cellular base station antennas utilizing the low-PIM palm concealment. The low-PIM palm concealment includes a nonmetallic (e.g., polymeric) sleeve positioned between the metal frond shaft and the metal frond receiver to prevent metal-to-metal contact between the frond shaft and the frond receiver. As an option, the low-PIM sleeve may include one more polymeric fastener channels to prevent metal-to-metal contact between the metal fasteners, the frond shaft, and the metal frond receiver.

Although a rare occurrence, a portion of the conventional concealment fronds has been known to occasionally become dislodged. For example, the polymeric frond stub has been known to occasionally break at the entry point between the polymeric palm stub and the metal frond shaft allowing the palm foliage to fall or blow away in high wind. To restrain the palm foliage, conventional concealment palm fronds may include a safety tether attaching the palm foliage to the frond receiver. In some cases, conventional palm fronds further include a secondary safety restraint including a metal (e.g., stainless steel) mesh positioned over the metal frond shaft before the frond shaft is installed into the frond receiver. After the frond shaft has been inserted into the frond receiver, the metal mesh extends over a portion of the frond shaft extending from the frond receiver and a portion of the frond receiver. A metal fastener is then used to attach the metal mesh to the metal frond receiver. The metal-to-metal interfaces between the metal mesh, the metal frond shaft, the metal frond receiver, and the metal fastener have been found to be an additional source of PIM generation in this type of concealment.

To mitigate PIM generation from the metal mesh secondary safety restraint, the low-PIM palm frond includes a nonmetallic (e.g., polymeric) secondary safety restraint. In addition, a nonmetallic (e.g., polymeric) grommet may also be used to isolate the metal fastener from the metal frond receiver Referring now to the tree concealment, the conventional tree concealment includes artificial tree branches attached to the mounting structure using partially threaded metal tree branch receivers. The tree branch receiver may thread directly into an anchor nut welded to the mounting structure, such as a steel monopole. In this embodiment, the partially threaded tree branch receiver is secured to the anchor nut using a jamb nut, which is tightened against the anchor nut to lock the tree branch receiver in place with a pair of fastener holes positioned in the desired orientation. The tree branch shaft then slides over the tree branch receiver, where it is secured to the tree branch receiver using fasteners extending through aligned fastener holes in the tree branch shaft and branch receiver. During testing, it was discovered that the metal fasteners extending through the metal tree branch receiver are significant sources of PIM for this type of concealment. In embodiments with metal tree branch shafts, the metal-to-metal interfaces between the tree branch shafts and the branch receivers are also significant sources of PIM.

There are also instances where the metal tree branch shaft slides over a metal tree branch receiver that is welded directly to the metal mounting structure. In this case, the metal tree branch receiver has the same fastener holes, which align with holes in the metal tree branch shaft. For this type of concealment, the metal fasteners extending through the fastener holes in the metal tree branch shaft and metal tree branch receiver have also been found to be significant PIM sources.

A first embodiment of the low-PIM tree branch concealment includes low-PIM nonmetallic (e.g., polymeric) fastener isolators received in the metal fastener holes of the metal tree branch receiver to prevent metal-to-metal contact between the fasteners and the tree branch receiver. An adhesive may be used to adhere each polymeric isolator in its respective fastener hole.

A second embodiment of the low-PIM tree branch concealment includes a low-PIM nonmetallic (e.g., polymeric) receiver sleeve positioned between the metal tree branch receiver and the metal tree branch shaft. The receiver sleeve may form nonmetallic (e.g., polymeric) fastener channels to prevent metal-to-metal contact between the fasteners and the tree branch receiver. An adhesive may be used to adhere the polymeric receiver sleeve to the metal tree branch receiver prior to sliding the metal tree branch shaft over the tree branch receiver.

Turning to the figures, reference will now be made in detail to specific representative embodiments of the invention. In general, the same or similar reference numerals are used in the drawings and the description to refer to the same or like parts or steps. The drawings are in simplified form and are not to precise scale unless specifically indicated.

FIG. 1 is a conceptual illustration of a low-PIM palm concealment assembly 10 for a cellular base station antenna 11. The low-PIM palm concealment assembly 10 and the cellular base station antenna 11 are located toward the top of a mounting structure, in this example a steel monopole 12 as commonly used in the industry. Other types of mounting structures may be utilized, such as lattice towers, guy-wired towers, building structures, and so forth. Regardless of the type of mounting structure, the low-PIM palm concealment assembly 10 includes a number of low-PIM palm fronds, represented by the enumerated palm frond 15, located in a PIM-reactive zone 16 of the base station antenna 11, where PIM generated by the palm fronds can interfere with the operation of the antenna.

While low-PIM palm fronds 15 can be utilized in any desired location, they are particularly effective for mitigating PIM interference when deployed in the PIM reactive zone 16 near the base station antenna 11. Although PIM generation is a function of the antenna broadcast frequency and power, technicians may use a standard distance, such as 10-feet from the antenna 11, to establish the PIM reactive zone 16 where PIM mitigation is appropriate. As other options, the potential PIM reactive zone 16 may be established as a function of the antenna broadcast frequency, such as one or two wavelengths of the main beam frequency channel of the antenna. Other factors, such as the broadcast power of the antenna, the presence of reflective surfaces in the physical environment of the antenna, the width of the uplink channel, the use of electronic filtering, and other relevant factors may also be taken into account when establishing the potential PIM reactive zone for a particular antenna. For administrative simplicity, however, the standard set for potential PIM reactive zone 16 may ultimately be defined to be a set distance, such as 10-feet from the antenna.

Figure 2A:
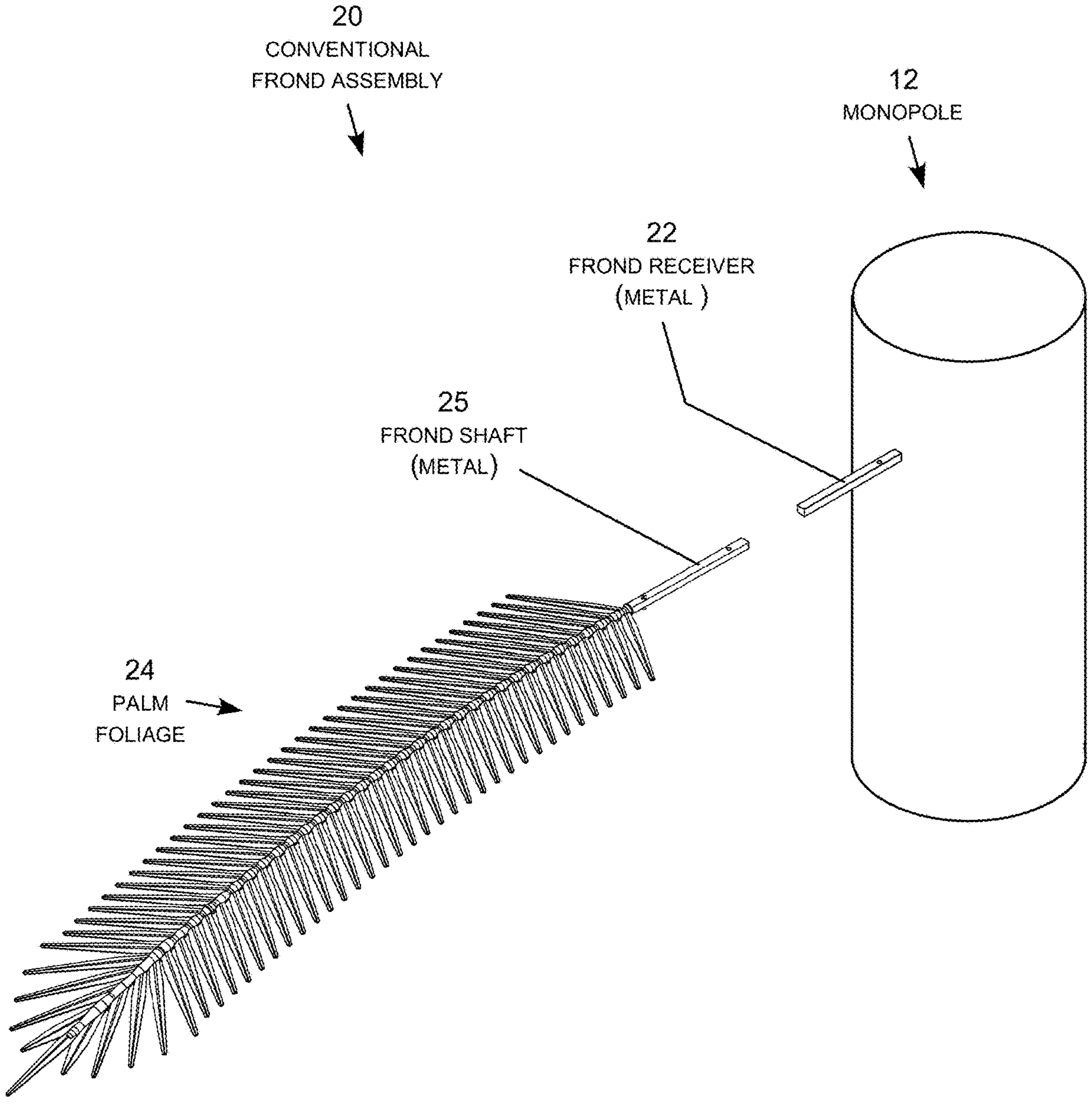
FIG. 2A (PRIOR ART)
FIGS. 2A-2C (prior art) are perspective views of a palm frond assembly in a conventional palm concealment.
Figure 2B:
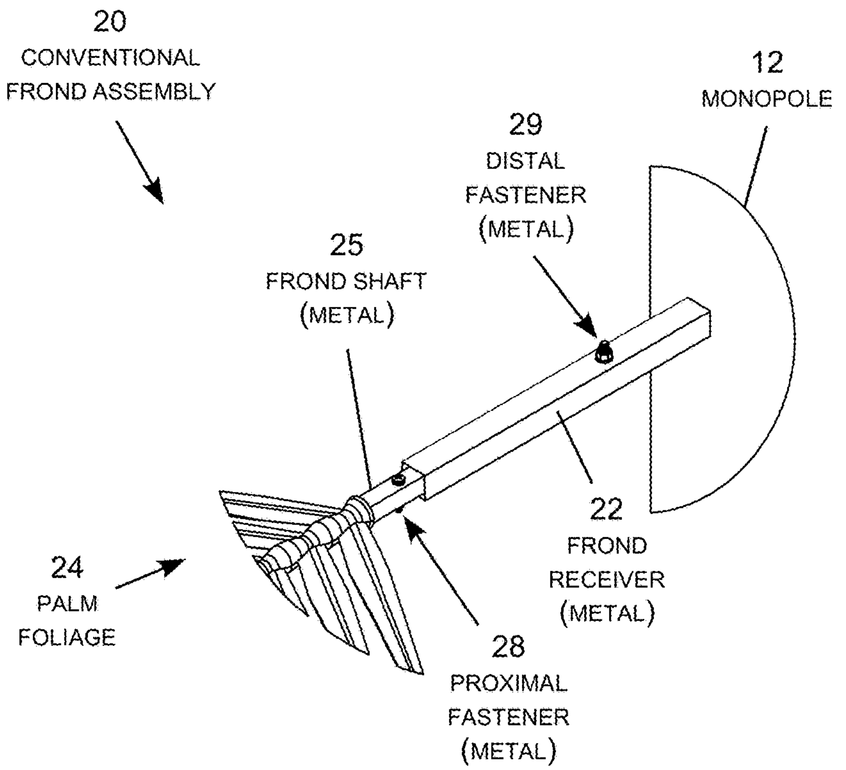
FIG. 2B (PRIOR ART)
Figure 2C:
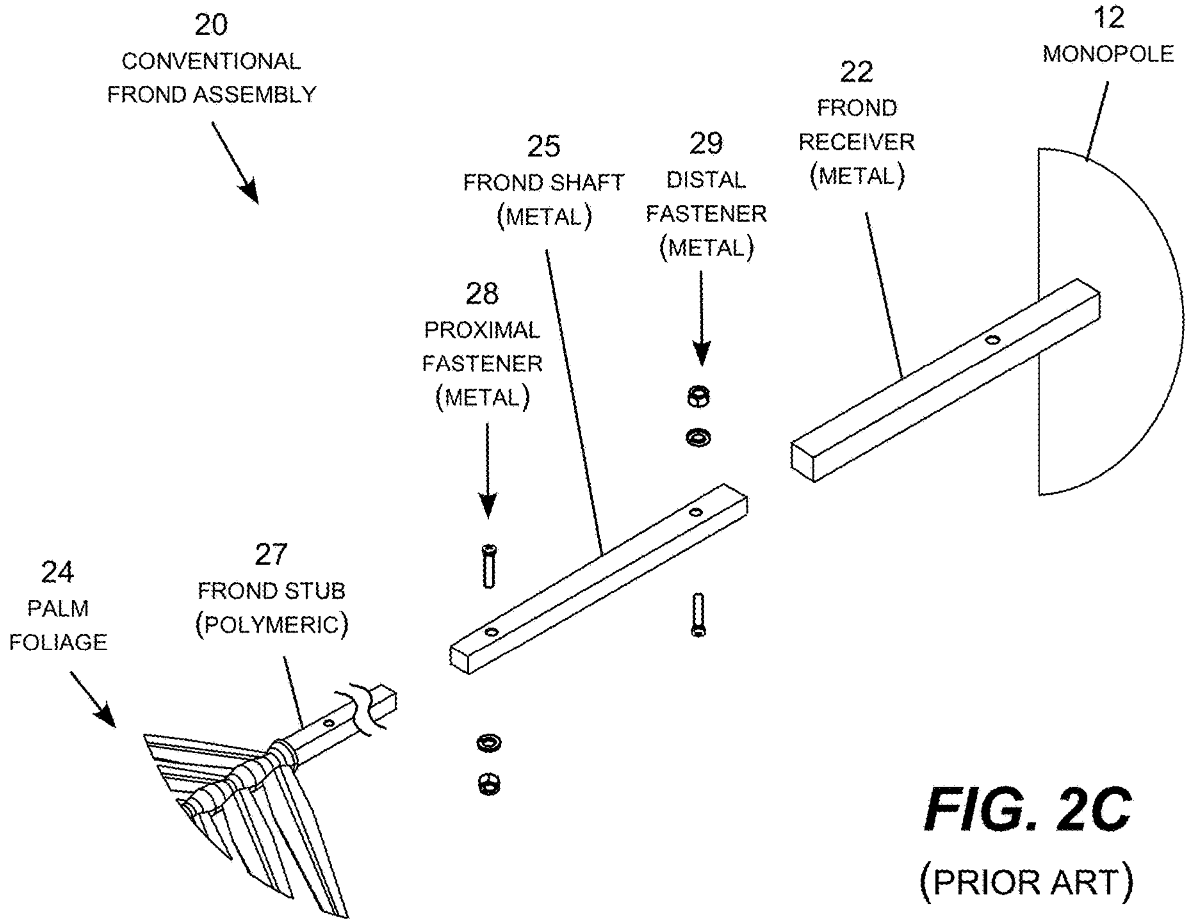
FIG. 2C (PRIOR ART)

FIGS. 2A-2C (prior art) are perspective views of a conventional palm frond concealment assembly 20. The conventional frond assembly 20 is attached to a monopole 12 by way of a representative metal frond receiver 22 welded to the monopole. The conventional frond assembly 20 includes polymeric palm foliage 24 and polymeric frond stub 27 extending from the palm foliage. The frond stub 27 is inserted in an axial direction into the metal frond shaft 25, where a proximal metal fastener 28 such as a bolt stack (also referred to as a "stub fastener" in this embodiment), attaches the palm stub to the metal frond shaft. The conventional frond assembly 20 is installed on the mounting structure 12 by sliding the metal frond shaft 25 into the metal frond receiver 22. The metal frond receiver 22 is then attached to the metal frond shaft 25 with a distal metal fastener 29, such as a bolt stack, extending through the metal frond receiver and the metal frond shaft. During testing, the metal-to-metal interface between the distal metal fastener 29, the metal frond shaft 25, and the metal-to-metal contact between the metal frond shaft 25 and the metal frond receiver 22 have been found to be significant sources of PIM in this type of concealment.

Figure 3A:
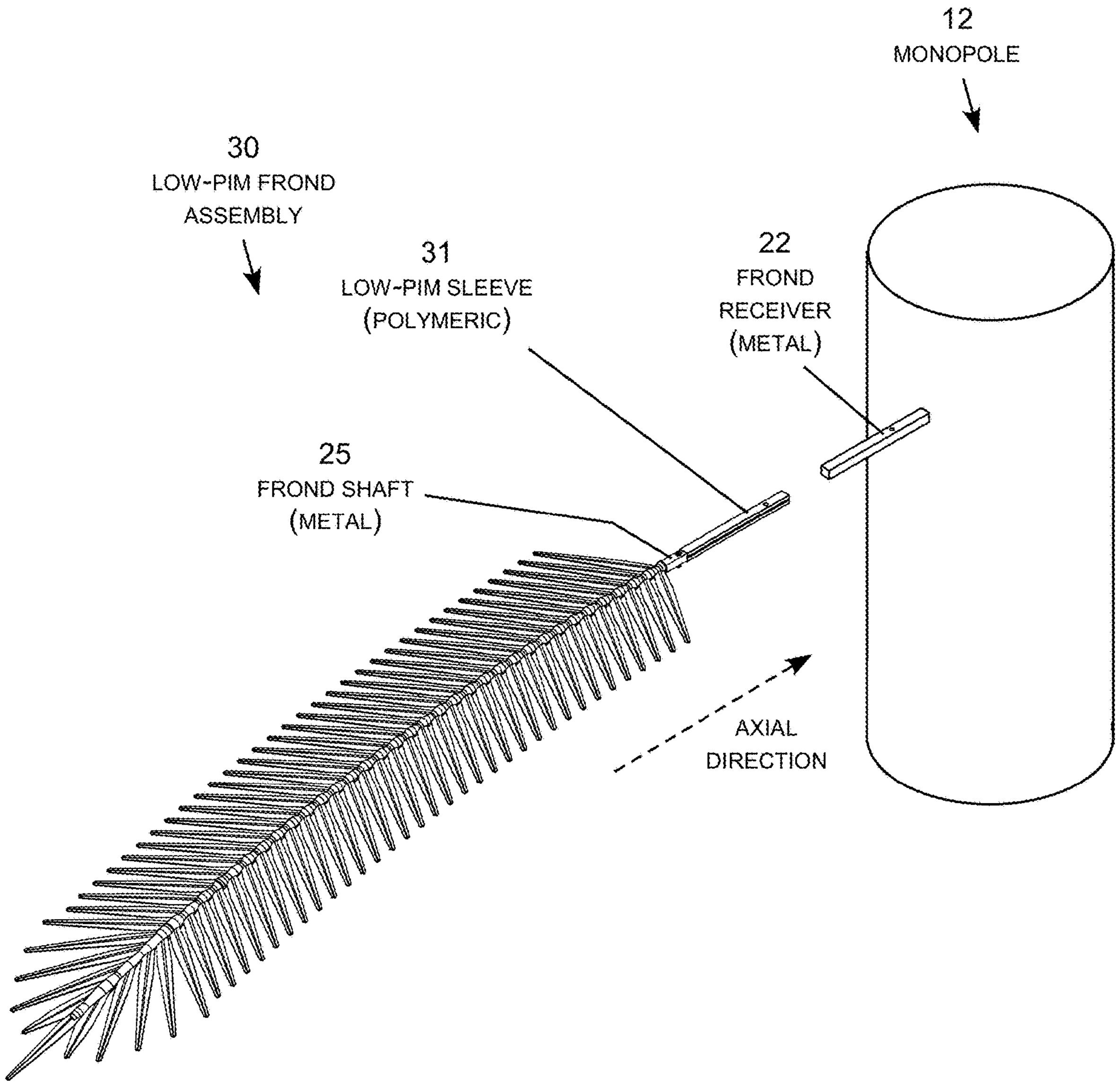
FIGS. 3A-3C are perspective views of a low-PIM palm frond assembly in accordance with an embodiment of the present invention.
Figure 3B:
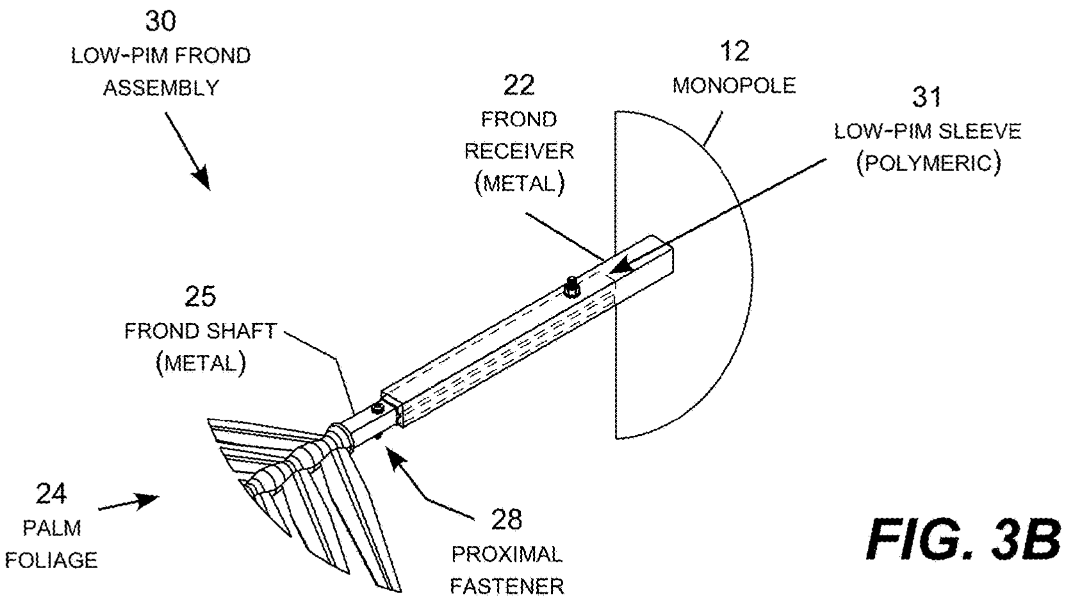
Figure 3C:
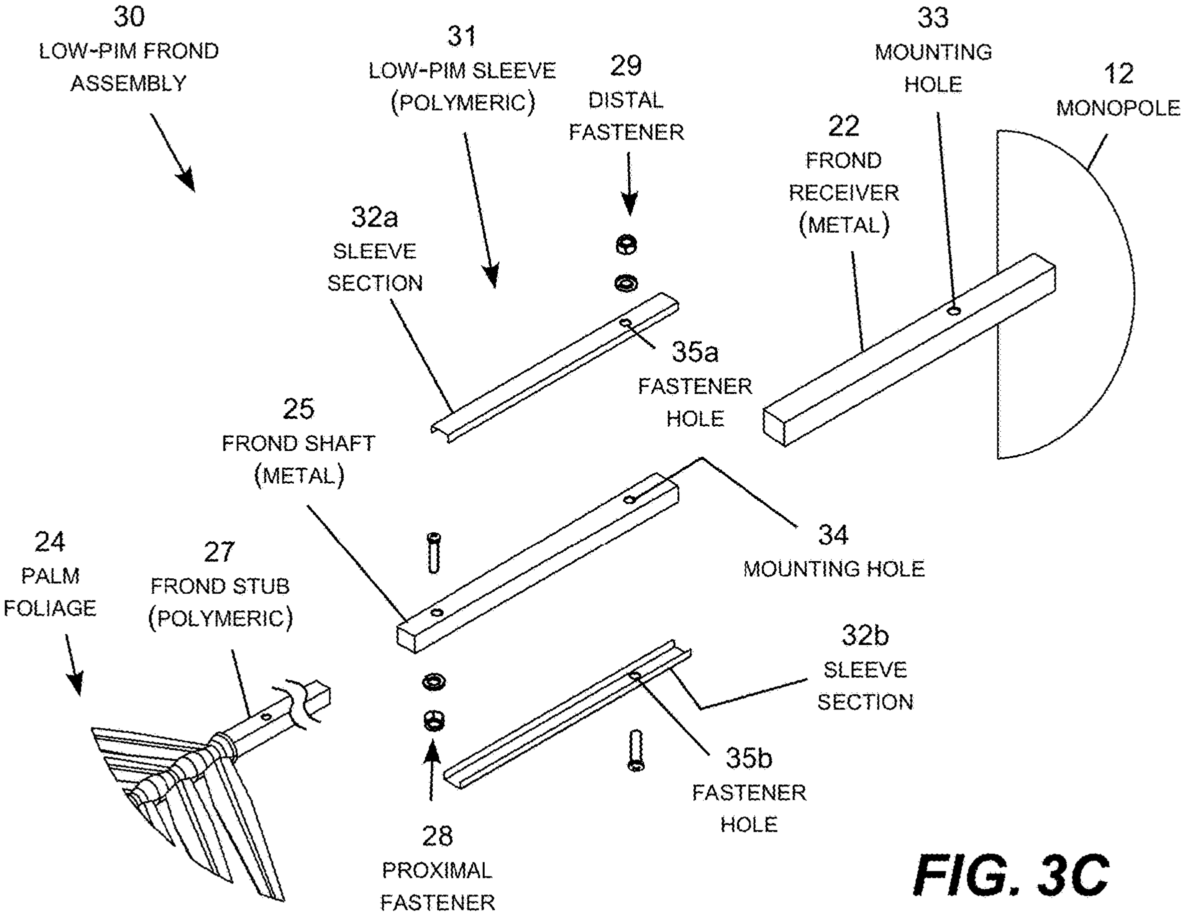

FIGS. 3A-3C are perspective views of a low-PIM palm frond assembly 30 in accordance with an embodiment of the present invention. The low-PIM palm frond assembly 30 may be similar to the conventional palm frond assembly 20, except that a low-PIM sleeve 31 fabricated from a nonmetallic (e.g., polymeric) material is positioned between the metal frond shaft 25 and the metal frond receiver 22. In this embodiment, the low-PIM sleeve includes first and second sleeve sections 32*a* and 32*b*. The metal frond shaft receiver 22 includes a mounting hole 33, the metal frond shaft 25 includes a mounting hole 34, the first sleeve section 32*a* includes a mounting hole 35*a*, the second sleeve section 32*b* includes a mounting hole 35*b*. These holes all align to receive the distal fastener 29, which secures the palm frond assembly 30 to the frond receiver 22 with the polymeric low-PIM sleeve 31, in this embodiment including the first and second sleeve sections 32*a* and 32*b*, isolating the metal frond receiver 22 from the metal frond shaft 25. In this embodiment, the low-PIM sleeve 31 is attached to the metal frond shaft 25 before inserting the low-PIM palm frond assembly 30 into the metal frond receiver 22. The low-PIM sleeve 31 mitigates PIM by preventing metal-to-metal contact between the metal frond receiver 22 and the metal frond receiver 25. Unlike the distal fastener 29 in this embodiment, the proximal fastener 28 attaching the frond stub 27 to the metal frond receiver 25 does not pass through the low-PIM sleeve 31 because this fastener was not identified as a significant PIM source during testing. As an option, however, the low-PIM sleeve 31 may be extended to so that the proximal fastener 28 also extends through the low-PIM sleeve. In this embodiment, the low-PIM sleeve 31 may also include another polymeric fastener channel for the proximal fastener 28.

Figure 4A:
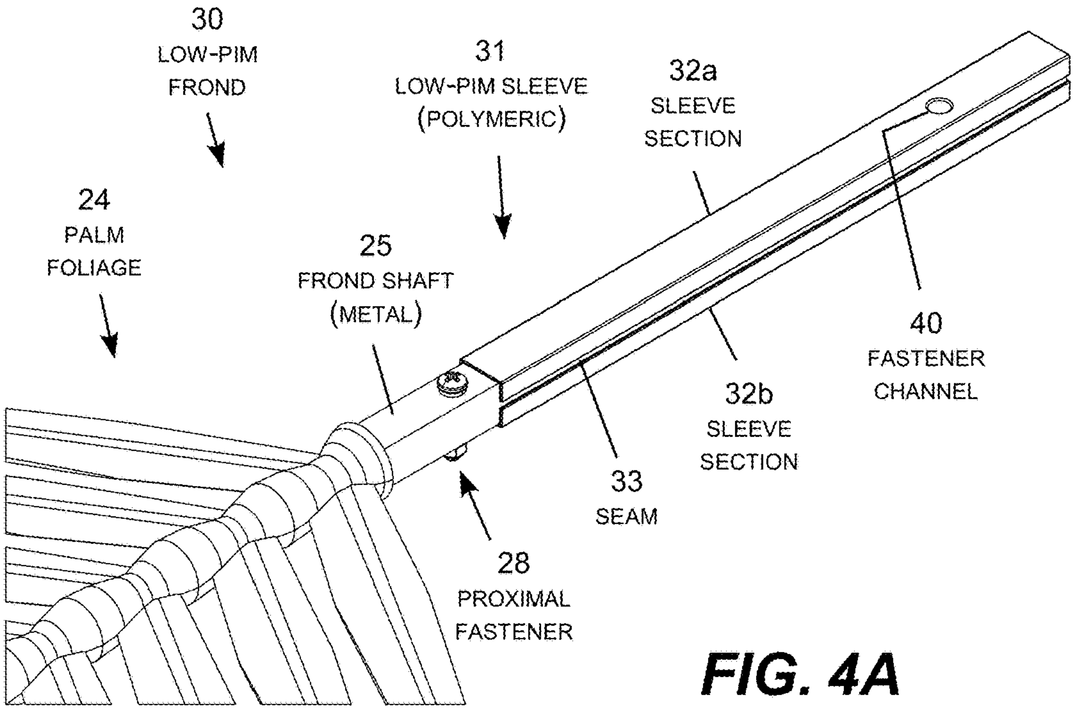
FIGS. 4A-4C are perspective views of a low-PIM sleeve in the low-PIM palm frond assembly.
Figure 4B:
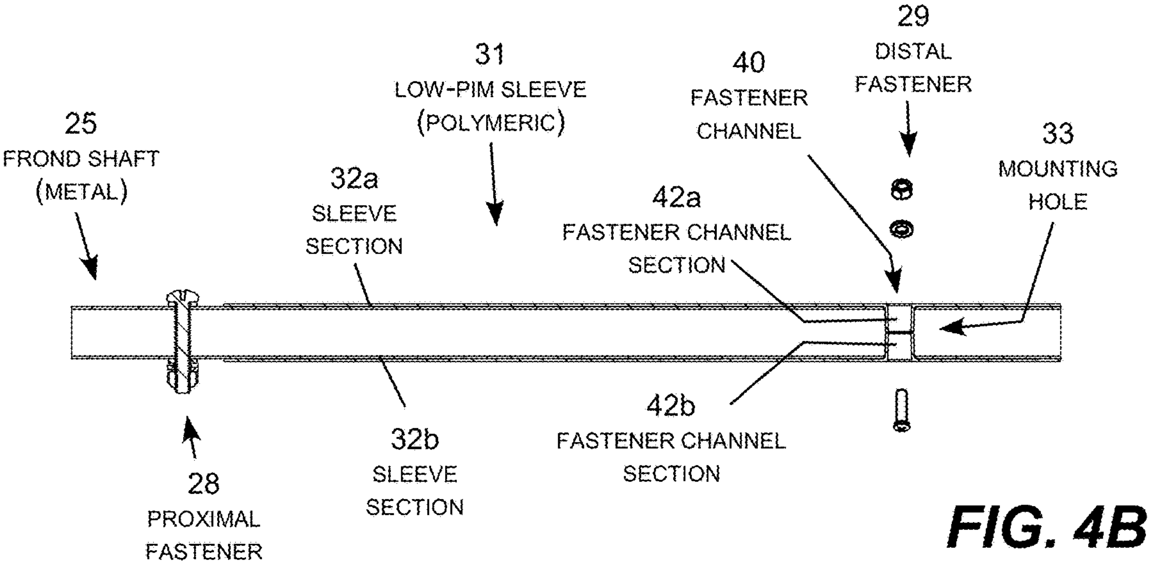
Figure 4C:
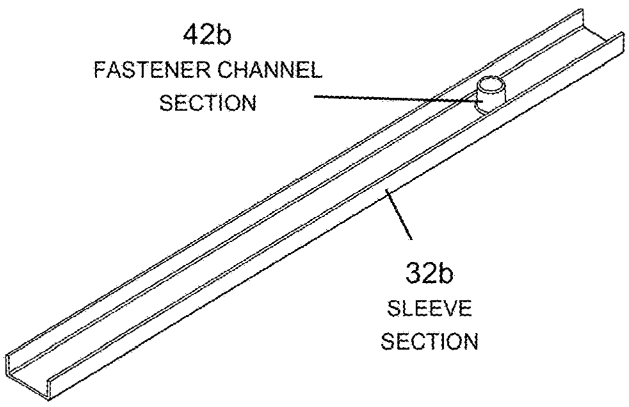

FIGS. 4A-4C are perspective views of the representative low-PIM sleeve 31, which includes first and second sleeve sections 32*a*-32*b* elongated in the axial direction forming a pair of seams extending in the axial direction represented by the enumerated seam 33 visible in FIG. 4A (the other axial seam is hidden on the opposing side of the frond). As an option shown in FIGS. 4B-4C, each sleeve section 32*a*-32*b* includes a respective fastener channel section 42*a*-42*b* forming a fastener channel 40 isolating the distal fastener 29 from the metal frond shaft 25. The fastener channel 40 mitigates PIM by preventing metal-to-metal contact between the distal metal fastener 29, the frond shaft 25, and the metal frond receiver 22. As another option, a sufficiently flexible sleeve with only one axial seam may be utilized.

Figure 5A:
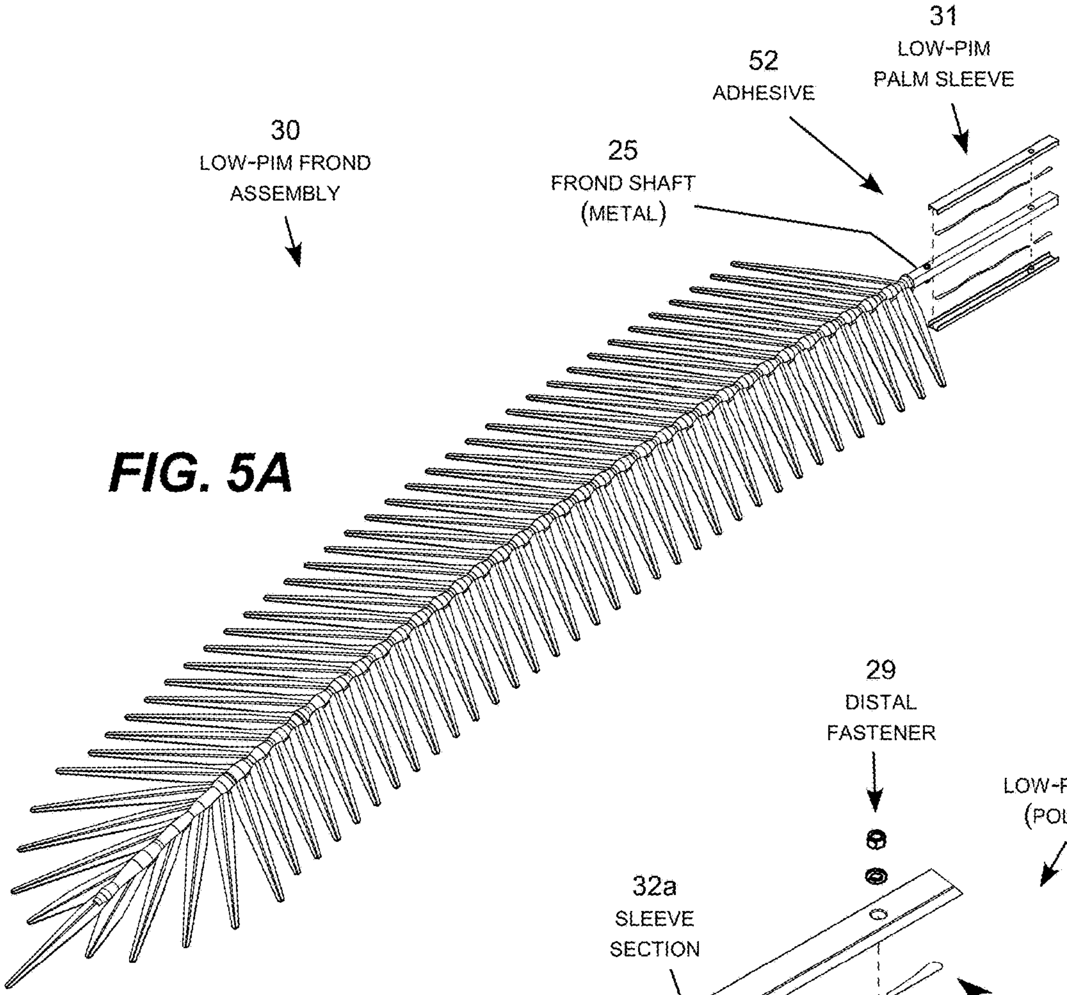
FIGS. 5A-5B are exploded perspective views of the low-PIM sleeve.
Figure 5B:
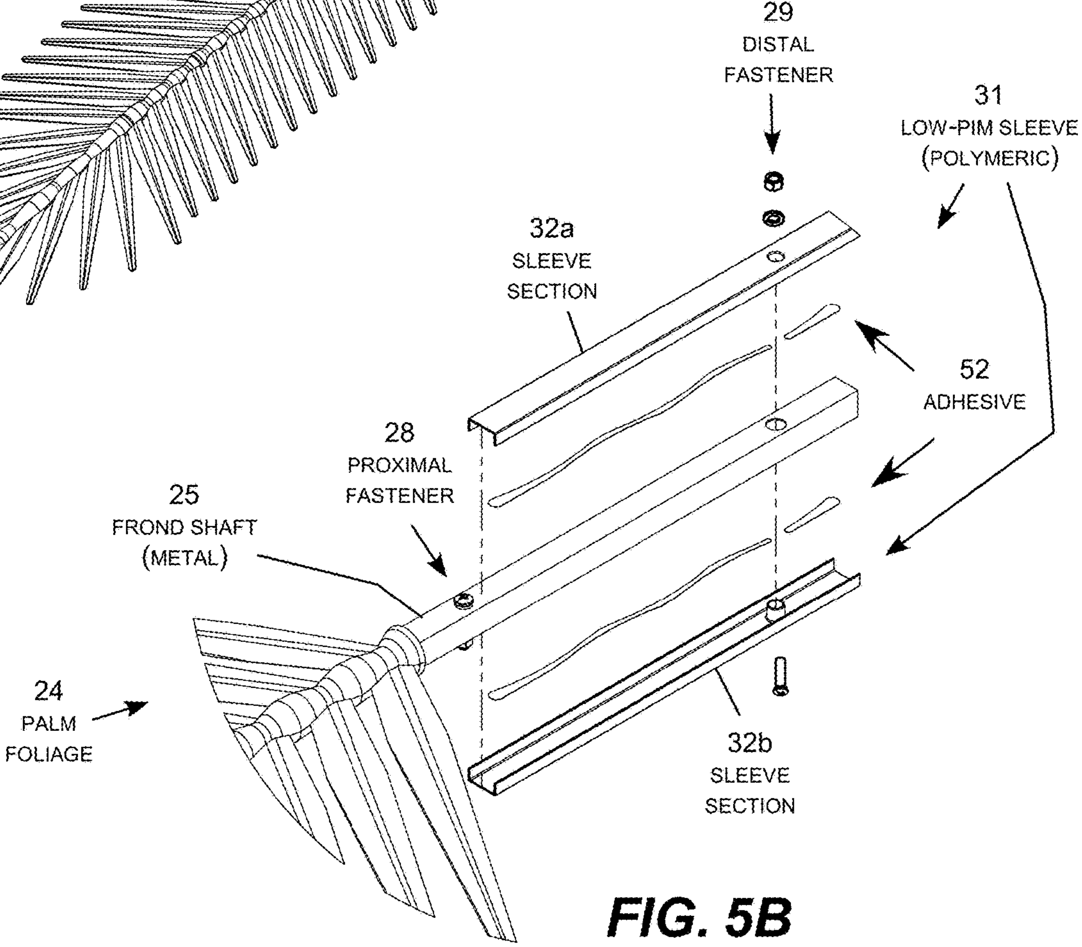

FIGS. 5A-5B are exploded perspective views of the low-PIM sleeve 31, which includes two sleeve sections 32*a*-32*b* adhered to the frond shaft 25 with adhesive 52. Once the adhesive 52 has set, the low-PIM frond assembly 30 can stored and handled without risk of dislodging or losing the low-PIM sleeve. To install the low-PIM frond assembly 30, the frond shaft 25 is inserted into the frond receiver 22 and secured in place by installing and tightening the distal fastener 29, which in this embodiment is a metal bolt stack, with the low-PIM sleeve 31 positioned between the metal frond shaft and the metal frond receiver 22.

Figure 6A:
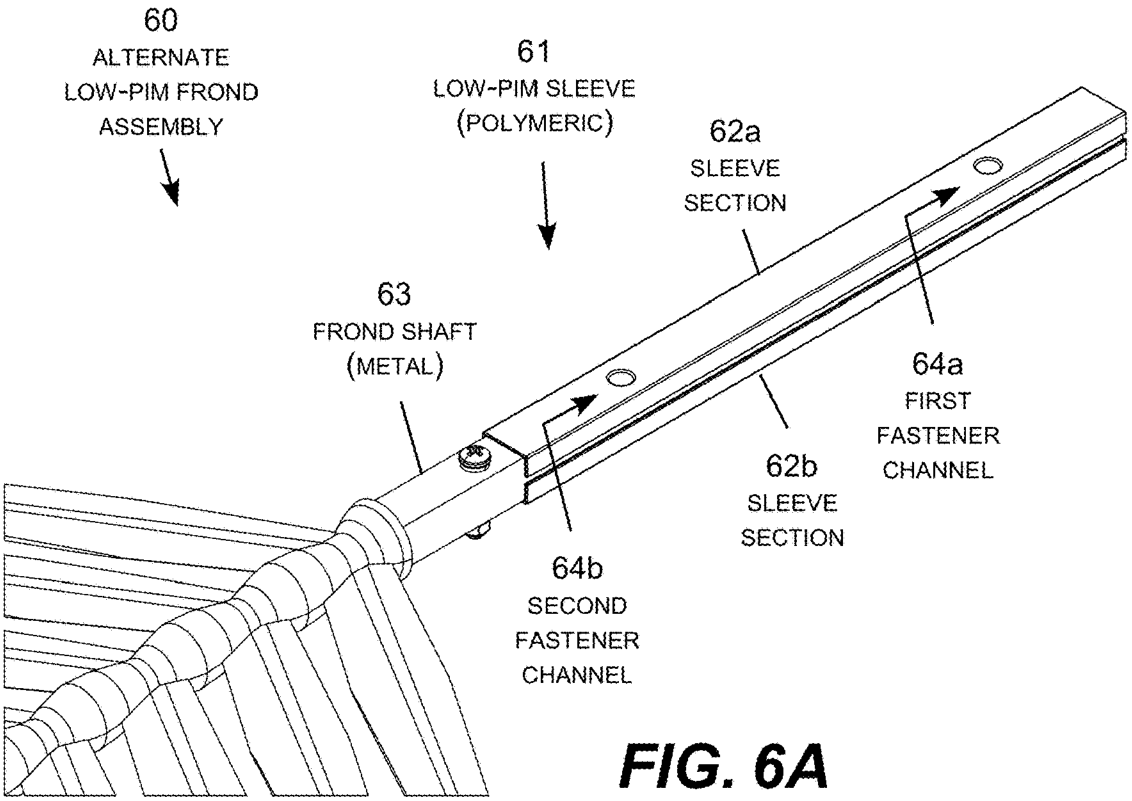
FIG. 6A is a perspective view of a first alternative low-PIM frond assembly.
Figure 6B:
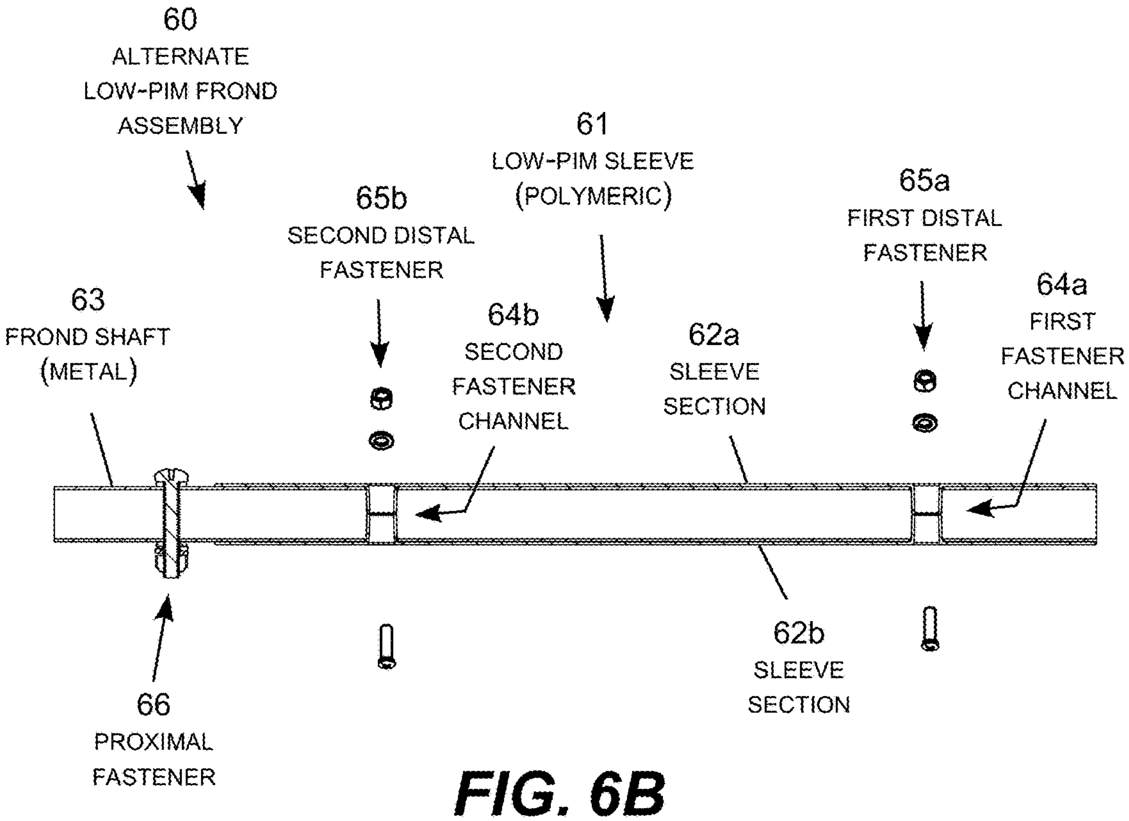
FIG. 6B is a cut-away side view of the first alternative low-PIM frond assembly.

FIG. 6A is a perspective view and FIG. 6B is a cut-away side view of an alternative low-PIM frond assembly 60 including an alternative low-PIM sleeve 61, which includes first and second sleeve sections 62*a*-62*b*. The alternative low-PIM frond assembly 60 may be the same as the low-PIM frond assembly 30 shown in FIGS. 3A-3C except the frond shaft 63 and the alternative low-PIM sleeve 61 define first and second fastener channels 64*a*, 64*b* configured to receive respective first and second distal fasteners 65*a*, 65*b*. The frond receiver is likewise adapted to receive two fasteners to secure the alternative low-PIM frond assembly 60 to the frond receiver. Those skilled in the art will appreciate that alternative embodiments may include any number of fastener channels and respective fasteners as a matter of design choice. In addition, the alternate low-PIM sleeve 61 may be extended so that the illustrated proximal fastener 66 passes through the alternate low-PIM sleeve.

Figure 6C:
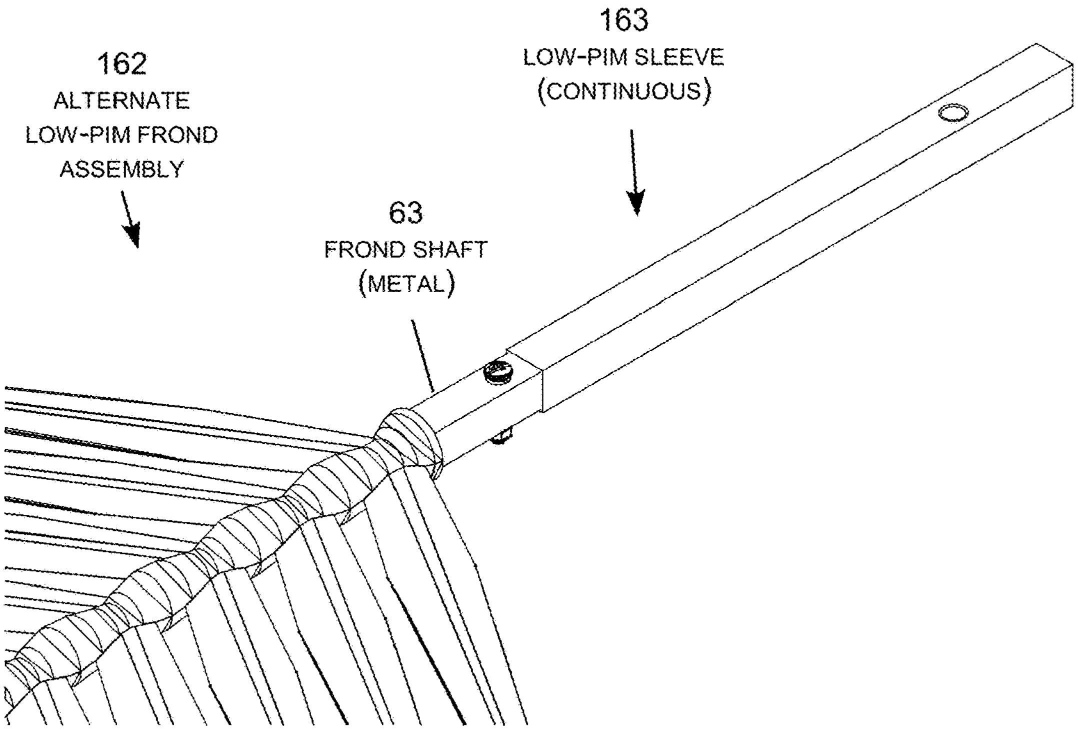
FIG. 6C is a perspective view of another alternative low-PIM frond assembly with a continuous low-PIM sleeve.
Figure 6D:
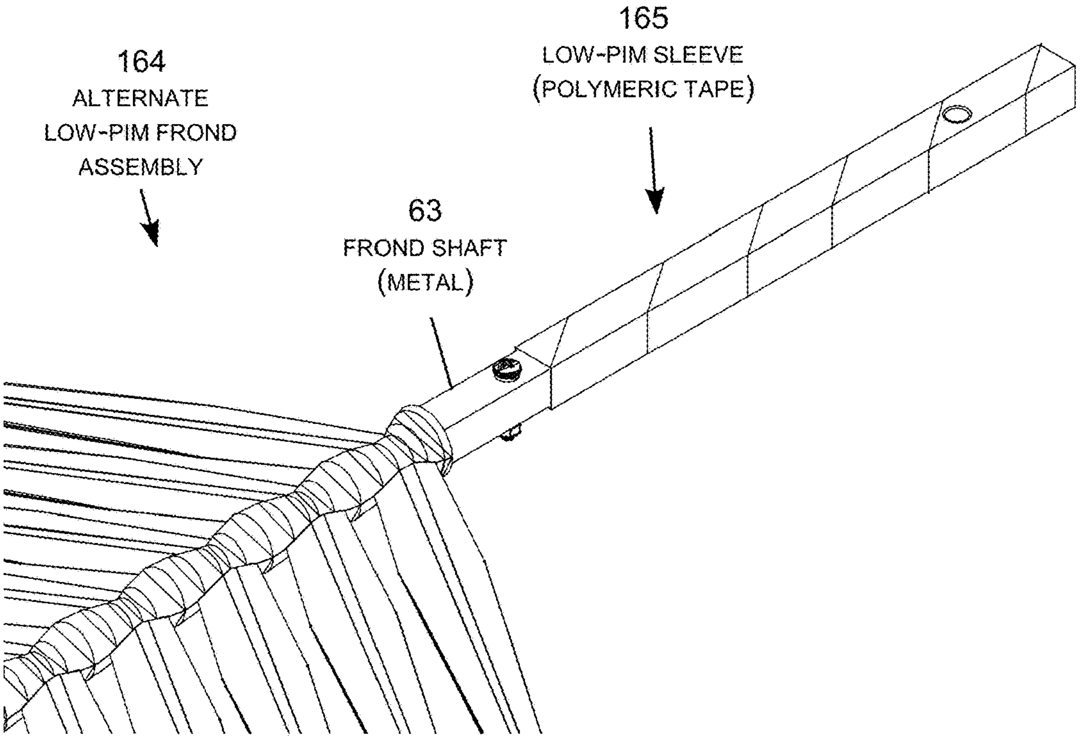
FIG. 6D is a perspective view of an additional alternative low-PIM frond assembly with a low-PIM sleeve formed by polymeric tape.
Figure 6E:
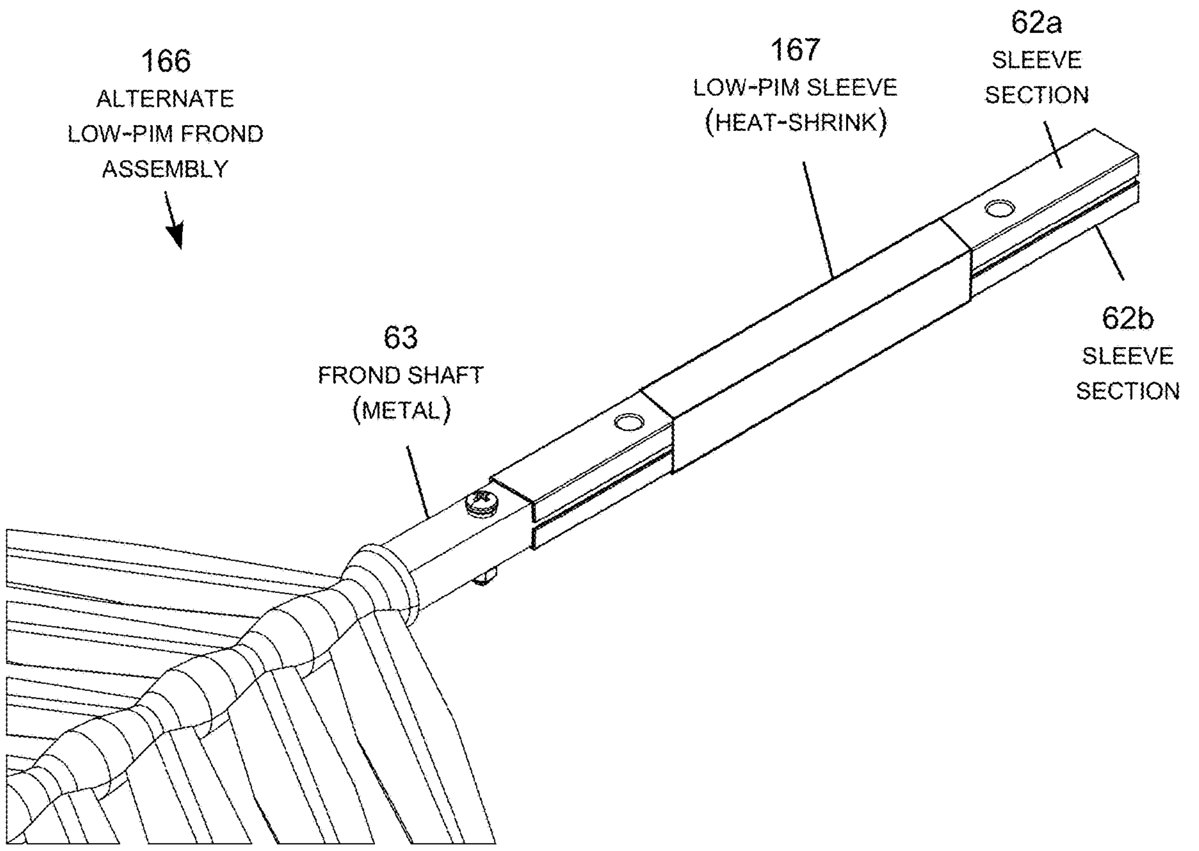
FIG. 6E is a perspective view of an additional alternative low-PIM frond assembly with a low-PIM with heat shrink attaching low-PIM sleeve sections to the frond shaft.

As another option, FIG. 6C is a perspective view of another alternative low-PIM frond assembly 162 with a continuous low-PIM polymeric sleeve 163, such as a sleeve applied by dipping, heat shrinking, or sliding the continuous low-PIM polymeric sleeve onto the metal frond shaft 63. As another option, FIG. 6D is a perspective view of an additional alternative low-PIM frond assembly 164 in which the low-PIM polymeric sleeve 165 is formed by polymeric tape wrapped around the metal frond shaft 63. FIG. 6E is a perspective view of an additional alternative low-PIM frond assembly 166 using a low-PIM using heat shrink 167 to attach low-PIM sleeve sections 62*a*-62*b* to the frond shaft 63 instead of the adhesive 52 shown in FIGS. 5A-5B.

Figure 7A:
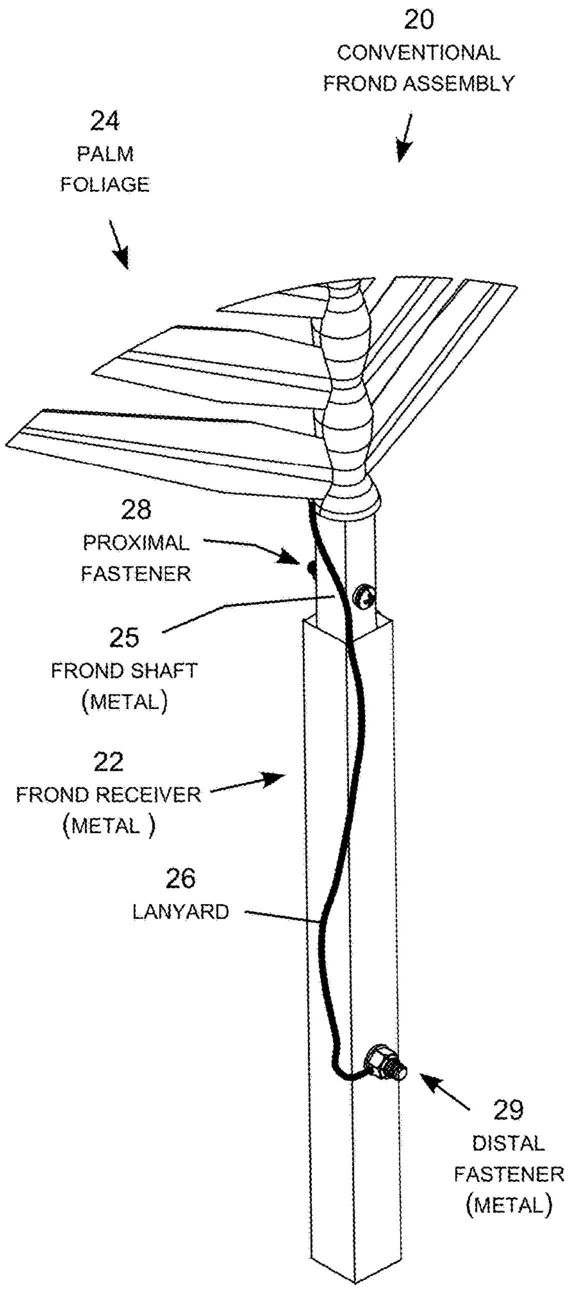
FIG. 7A (PRIOR ART)
FIG. 7A (prior art) is a perspective illustration of a conventional safety restraint system for a concealment palm frond.
Figure 7B:
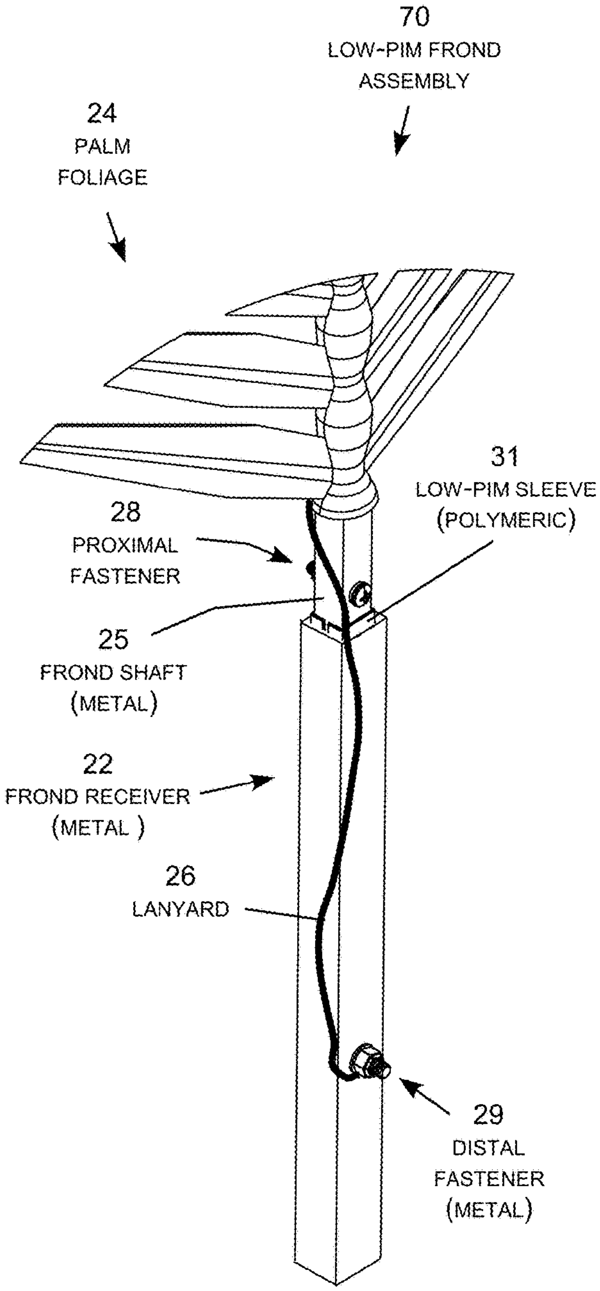
FIGS. 7B-7C are perspective illustrations of a low-PIM safety restraint system for the low-PIM palm frond.

FIG. 7A (prior art) is a perspective illustration of a conventional safety restraint system for the conventional frond assembly 20. Although a rare occurrence, the palm foliage 24 of the conventional frond assembly 20 has been known to occasionally become dislodged. For example, the polymeric frond stub 27 (shown in FIG. 3C) has been known to occasionally break at the entry point between the polymeric palm stub and the metal frond shaft 25 allowing the palm foliage 24 to fall or blow away. To restrain the palm foliage, the conventional frond assembly 20 may include a safety tether, lanyard 26, attaching the palm foliage 24 to the frond receiver 22. FIG. 7B shows a low-PIM frond assembly 70, which includes the low-PIM sleeve 31, further including the lanyard 26 safety restraint attached to the palm foliage 24 and the distal fastener 29.

In some cases, conventional palm fronds further include a secondary safety restraint including a metal (e.g., stainless steel) mesh restraint positioned over the metal frond shaft 25 before the frond shaft is installed into the frond receiver. After the frond shaft has been inserted into the frond receiver, the metal mesh restraint extends over a portion of the frond shaft 25 extending from the frond receiver 22 and a portion of the frond receiver 22. The distal metal fastener 29 is then used to attach the metal mesh restraint to the metal frond receiver 22. The metal-to-metal interfaces between the metal mesh, the metal frond shaft, the metal frond receiver, and the metal fastener have been found to be an additional source of PIM generation in this type of concealment.

Figure 7C:
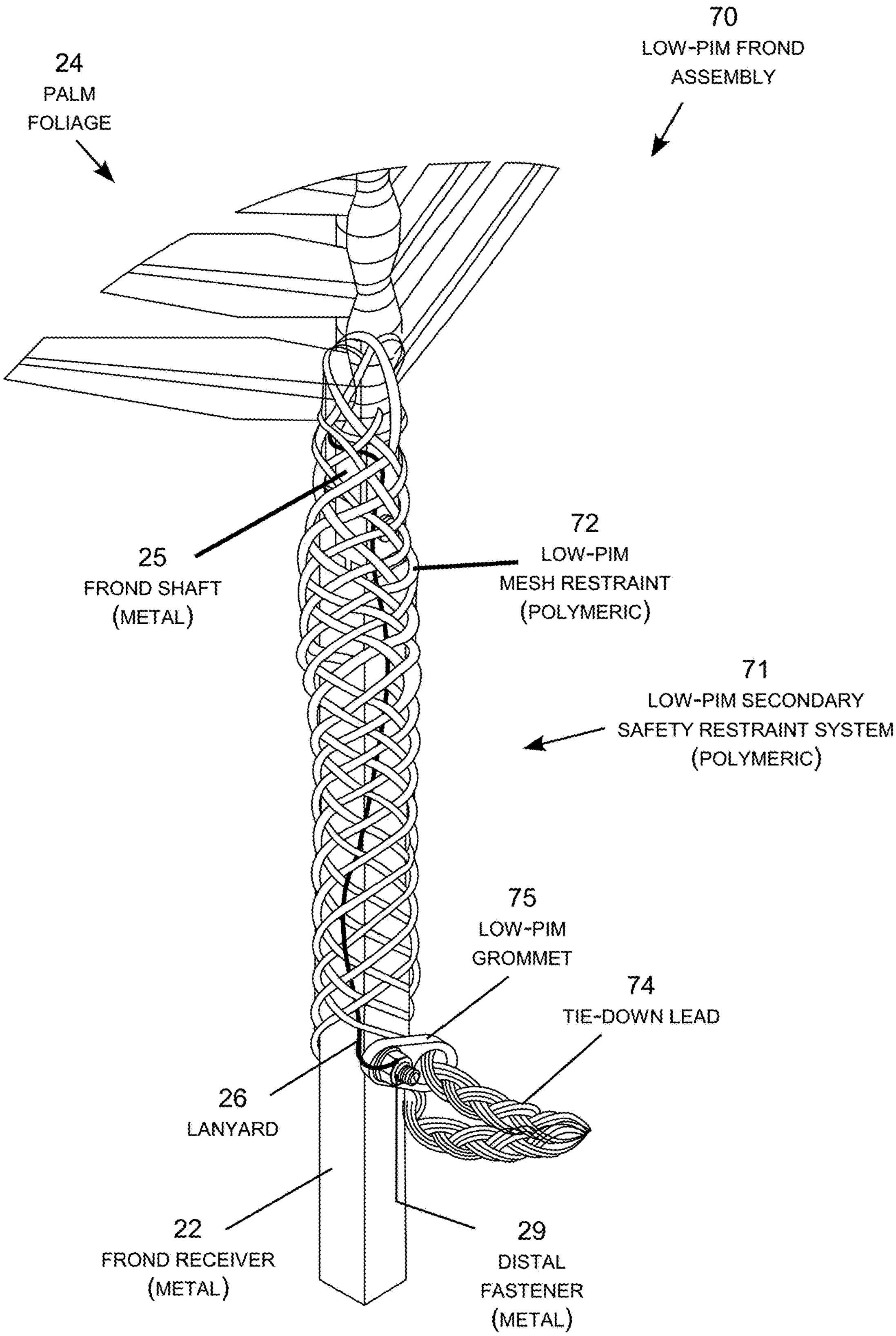

FIG. 7C is a perspective illustration of the low-PIM frond assembly 70 further including a low-PIM secondary safety restraint system 71. The low-PIM secondary safety restraint system 71 includes a low-PIM nonmetallic (e.g., polymeric) mesh restraint 72 extending over a portion of the metal frond shaft 25 extending from the metal receiver 22 and a portion of the metal frond receiver. The bottom of the mesh restraint 72 forms a tie-down lead 74, which is tied to a nonmetal-nonmetallic (polymeric) low-PIM grommet 75, which is attached to the frond receiver 22 by the distal fastener 29. In this embodiment, the mesh restraint 72 may be secured to the frond shaft 25 and/or the palm foliage 24 by a cable tie, lash or other suitable fastener. Alternatively or additionally, the lanyard 26 may be looped or entwined with the mesh restraint 72 to secure the mesh restraint to the palm foliage. If the palm foliage should become dislodged, the mesh restraint 72 tightens against the portion of the frond shaft 25 extending from the frond receiver 22, as well as the frond receiver 22, to provide a very secure safety restraint configured to stand up to very high winds including hurricane force winds.

Referring now to tree concealments, the conventional tree concealment includes artificial tree branches attached to the mounting structure using partially threaded metal tree branch receivers. The tree branch receiver typically threads directly into an anchor nut welded to the mounting structure, such as a steel monopole. The partially threaded tree branch receiver is secured to the anchor nut using a jamb nut, which is tightened against the anchor nut to lock the tree branch receiver in place with a pair of fastener holes positioned in the desired orientation for receiving the tree branch shaft. Alternatively, the tree branch receiver may be welded directly to the mounting structure. In either case, the tree branch shaft slides over the tree branch receiver, where it is secured to the tree branch receiver using metal fasteners extending through fastener holes in the tree branch shaft and metal branch receiver. During testing, it was discovered that metal fasteners securing the branch shafts to the metal branch receivers are significant sources of PIM for this type of concealment.

Figure 8:
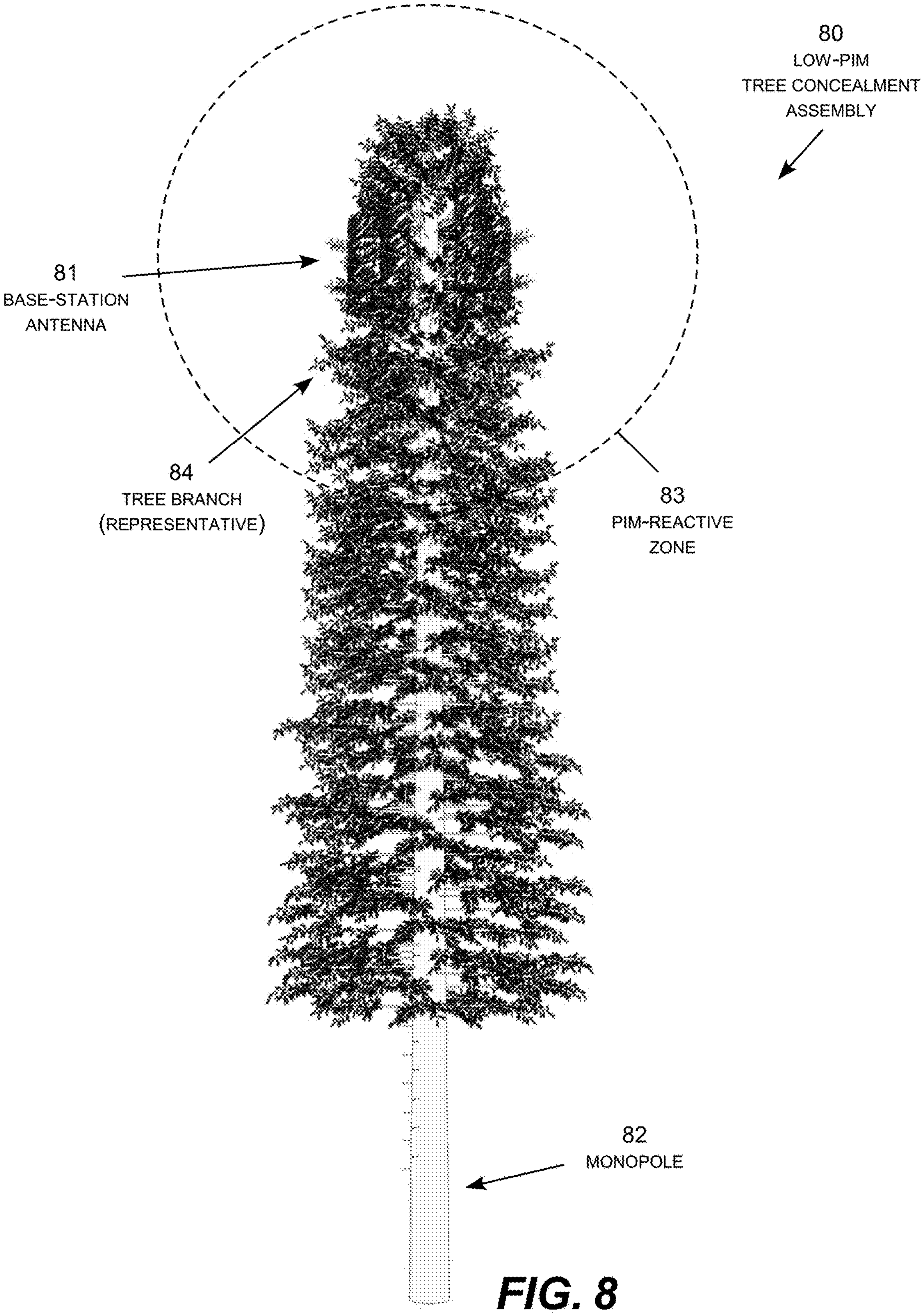
FIG. 8 is a conceptual illustration of a low-PIM tree concealment assembly for a cellular base station antenna.

FIG. 8 is a conceptual illustration of a low-PIM tree concealment assembly 80 for a cellular base station antenna 81. The cellular base station antenna 81 is located toward the top of a mounting structure, in this example a steel monopole 82 as commonly used in the industry. Other types of mounting structures may be utilized, such as lattice towers, guy-wired towers, building structures, and so forth. Regardless of the type of mounting structure, the tree concealment 80 includes a number of low-PIM tree branches, represented by the enumerated tree branch 84, located in a PIM-reactive zone 83 of the base station antenna 81, where PIM generated by the tree branches can interfere with the operation of the antenna. While low-PIM tree branch assembly 84 of the present invention can be utilized in any desired location, they are particularly effective for mitigating PIM interference when deployed in the PIM reactive zone near the concealed base station antenna.

Figure 9A:
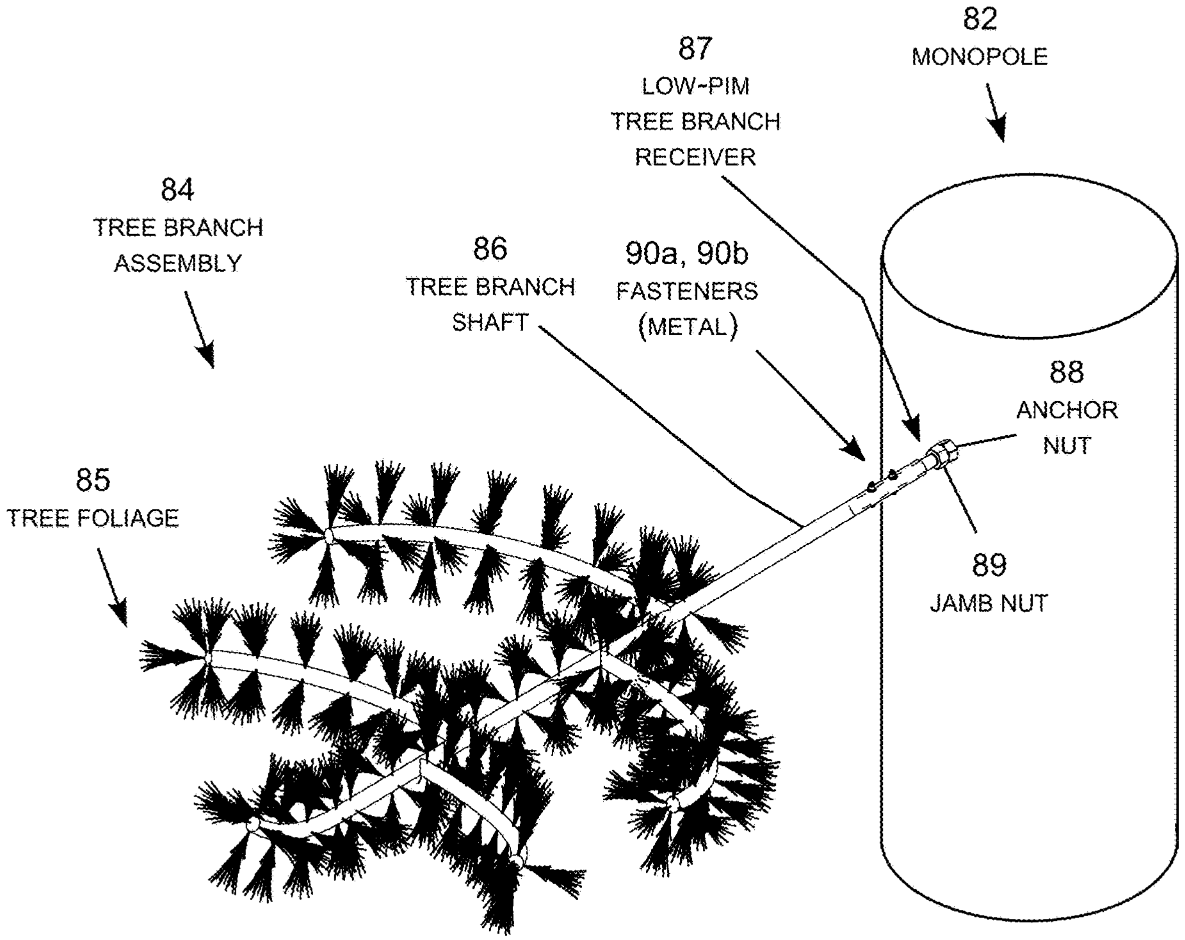
FIG. 9A is a perspective view of a low-PIM tree branch assembly in accordance with an embodiment of the present invention.

FIG. 9A is a perspective view of the low-PIM tree branch assembly 84, which includes tree foliage 85 and a tree branch shaft 86. which may be metal or polymeric (e.g., fiberglass), that slides over a low-PIM tree branch receiver 87. The low-PIM tree branch receiver 87 includes a metal rod with a threaded end that screws into an anchor nut 88 welded to the support structure, in this example the monopole 82. A jamb nut 89 on the threaded end of the tree branch receiver 87 is tightened against the anchor nut 88 to secure the tree branch receiver in place. Alternatively, the tree branch receiver 87 may be welded directly to the support structure. Metallic fasteners 90*a*, 90*b* secure the tree branch shaft 86 to the low-PIM tree branch receiver 87. The low-PIM tree branch receiver 87 includes nonmetallic (e.g., polymeric) low-PIM isolators between the metallic fasteners 90*a*, 90*b* and the metal rod of the branch receiver 87. Two examples of the low-PIM isolators are described below, nonmetallic (e.g., polymeric) low-PIM fastener hole isolators and nonmetallic (e.g., polymeric) low-PIM sleeves.

Figure 9B:
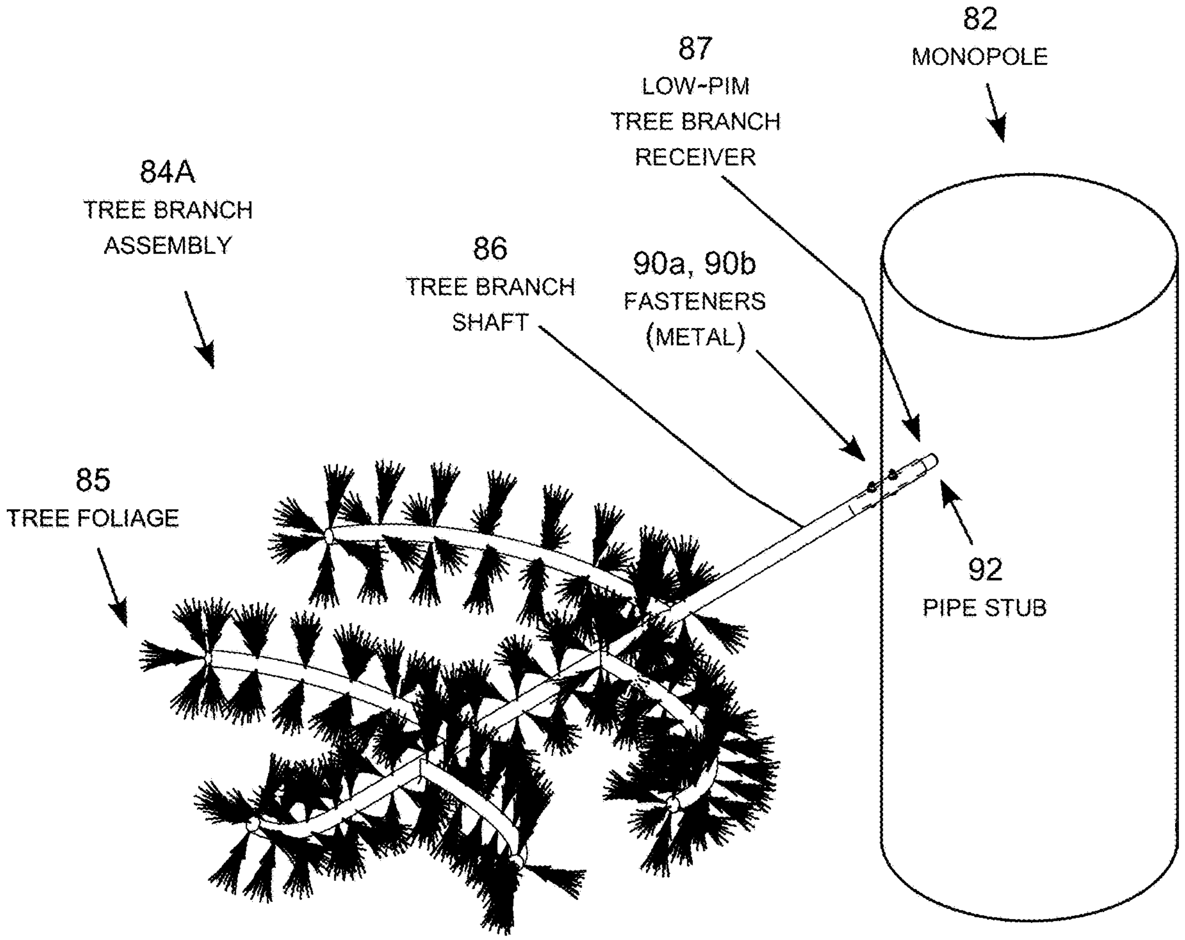
FIG. 9B is a perspective view of an alternative low-PIM tree branch assembly.

FIG. 9B is a perspective view of an alternative low-PIM tree branch assembly 84A, which is similar to the low-PIM tree branch assembly utilizing a 84 except tree branch receiver 84 including a solid metal rod attached by the anchor nut 88 and jamb nut 89 is replaced by a pipe stud 92 welded to the monopole 82. In addition to the isolators described with reference to FIGS. 10A-10B, the hollow pipe stud 92 can be filled with a polymeric material to secure the isolators in place. Other types of low-PIM isolators, such as those described with reference to FIGS. 11A-11B and 12-13 can also be used with the pipe stud 92.

Figure 10A:
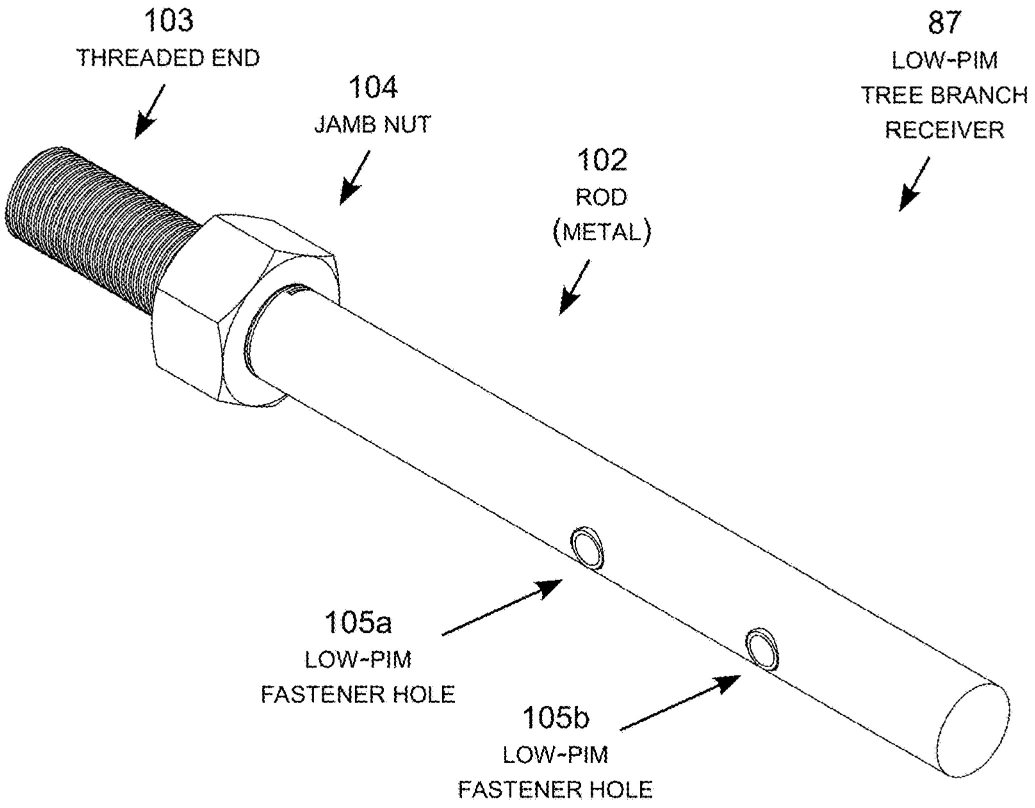
FIGS. 10A-10B are exploded perspective views of a low-PIM branch receiver in the low-PIM tree concealment.
Figure 10B:
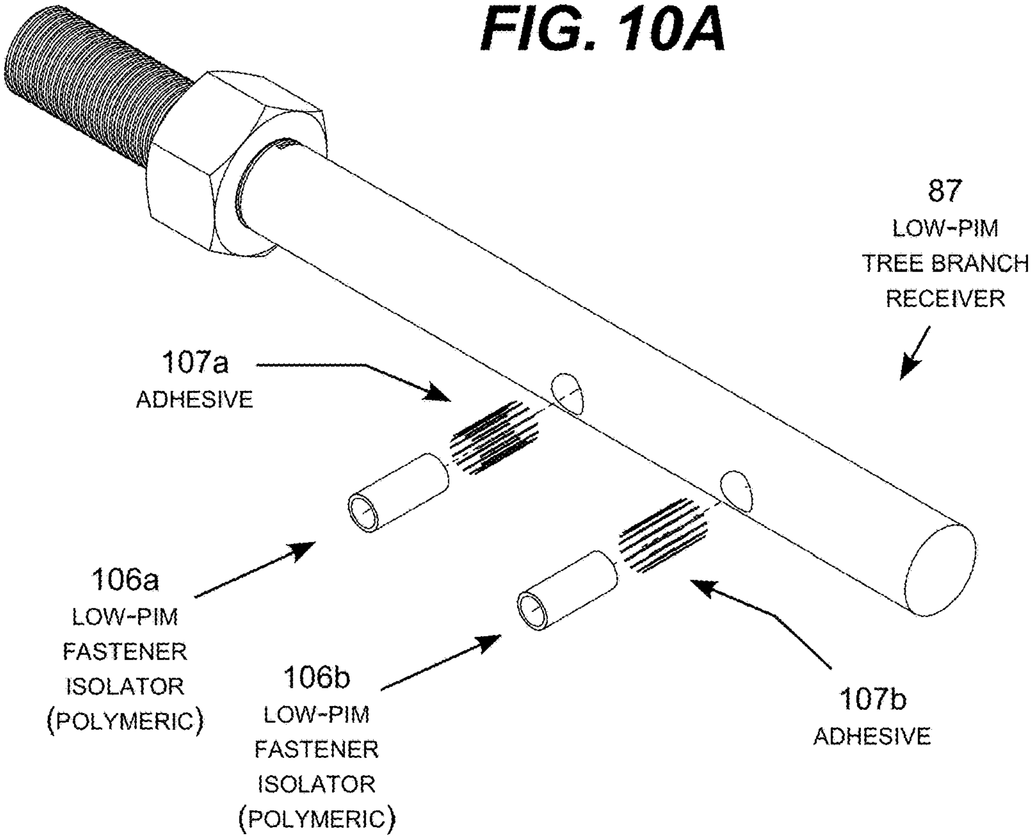

FIGS. 10A-10B are exploded perspective views of a first example of the low-PIM tree branch receiver 87, which includes a metal rod 102 with a threaded end 103 carrying the jamb nut 104. The metal rod 102 also includes low-PIM fastener holes 105*a*, 105*b*, which are lined with respective nonmetallic (e.g., polymeric) isolators 106*a*, 106*b* received in the metal fastener holes of the metal rod 102 to prevent metal-to-metal contact between the metal fasteners 90*a*, 90*b* (shown in FIG. 9) and the metal rod 102. Adhesive 107*a*, 107*b* may be used to adhere each polymeric isolators 106*a*, 106*b* in their respective fastener holes 105*a*, 105*b*.

Figure 11A:
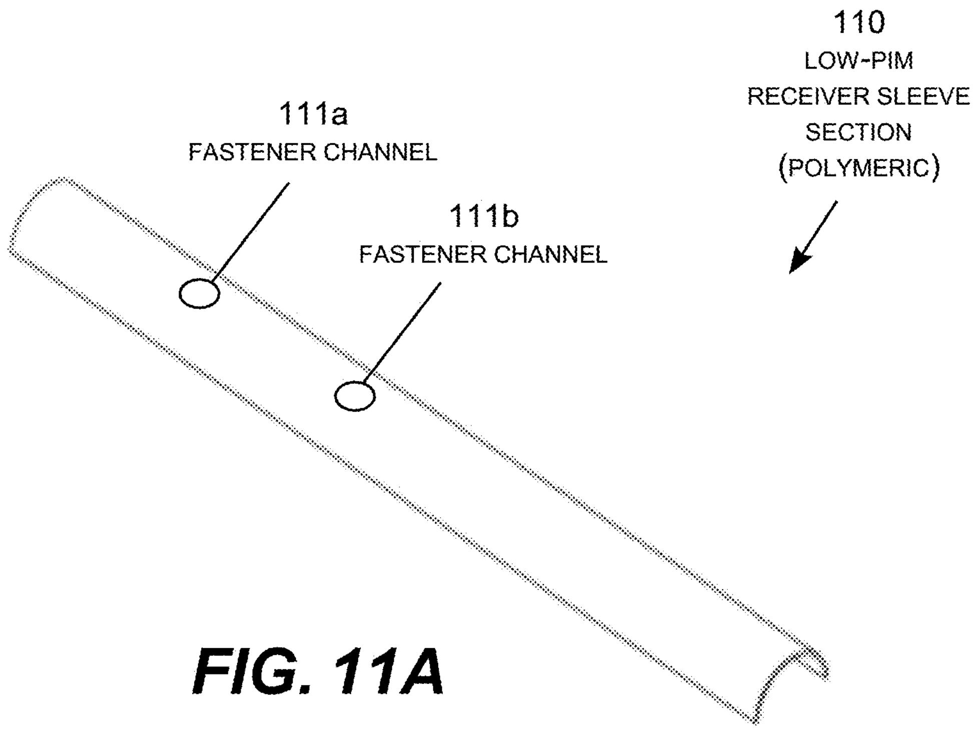
FIGS. 11A-11B are perspective views of a low-PIM receiver sleeve section for the low-PIM tree branch receiver.
Figure 11B:
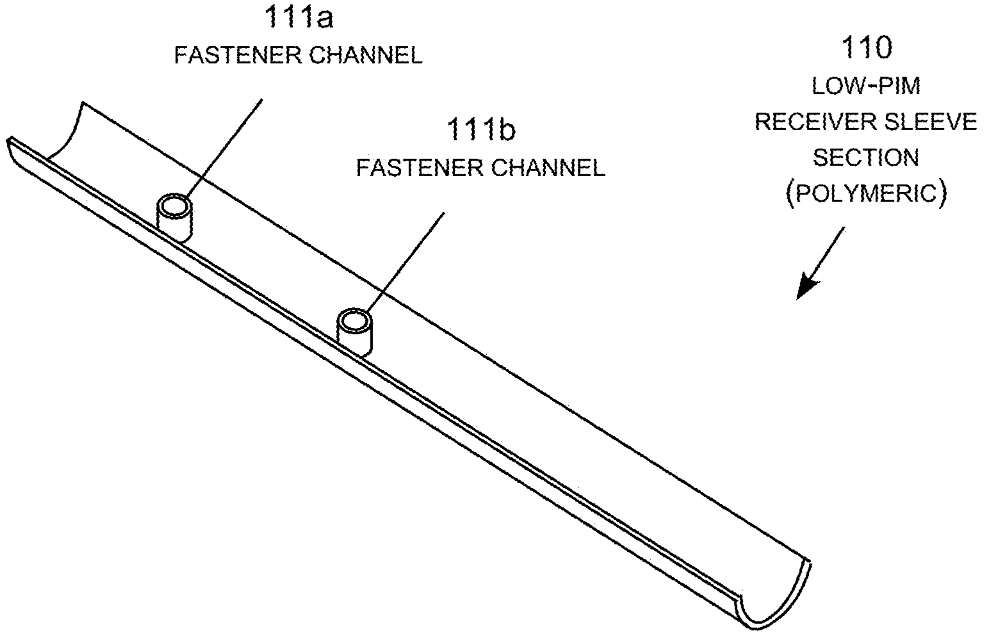
Figure 12:
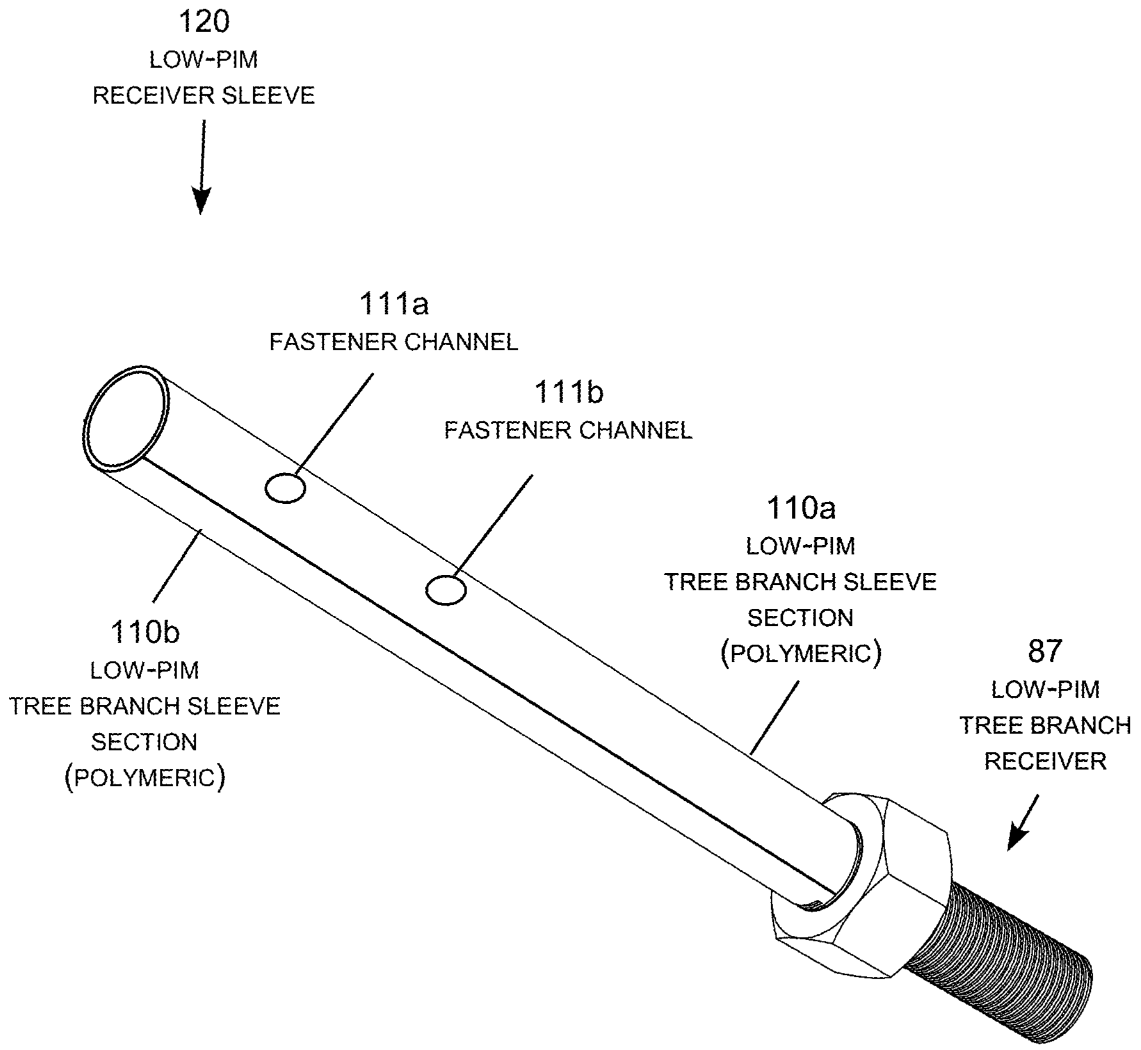
FIG. 12 is a perspective view of a low-PIM receiver sleeve including a pair of the low-PIM receiver sleeve sections.

FIGS. 11A-11B are perspective views of a low-PIM receiver sleeve section 110 for an alternative embodiment of the nonmetallic (e.g., polymeric) isolators for the low-PIM tree branch receiver. FIG. 12 is a perspective view of an isolator sleeve 120 formed from a pair of the sleeve sections 110 covering the non-threaded portion of the metal rod 102 of the low-PIM branch receiver 87. This embodiment provides additional PIM isolation for embodiments in which the tree branch shaft 86 (shown in FIG. 9) is metal to prevent loose metal-to-metal contact between the metal tree branch shaft and the metal rod 102 of the tree branch receiver 87 (shown in FIGS. 10A-10B). In this representative example, the isolator includes a low-PIM receiver sleeve 120 formed by a pair of the low-PIM receiver sections 110*a*-110*b* positioned between the tree branch shaft 86 and the metal rod 102 of the tree branch receiver 87. An adhesive may be used to adhere the polymeric receiver sleeve sections to the metal tree branch receiver prior to sliding the metal tree branch shaft over the tree branch. The low-PIM branch receiver sleeve section 110 fits over non-threaded portion of the metal rod 102 and includes fastener channels 111*a*, 111*b* that line the fastener holes through the non-threaded portion of the metal rod 102 of the low-PIM branch receiver 87. As shown in FIG. 12, for example, a pair of the low-PIM receiver sleeve sections 110*a*, 110*b* are positioned to create a complete receiver sleeve 120 covering the non-threaded portion of the metal rod 102 of the low-PIM branch receiver 87.

Figure 13:
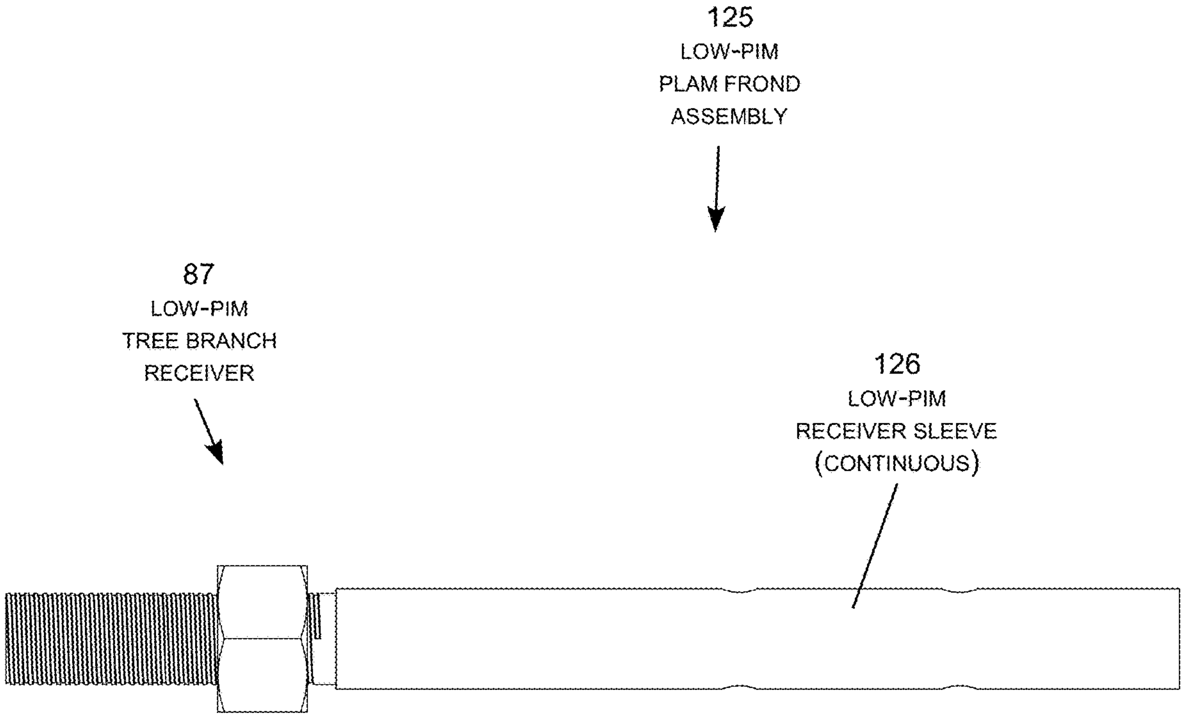
FIG. 13 is a perspective view of an alternative low-PIM frond assembly. with a continuous low-PIM sleeve.
Figure 14:
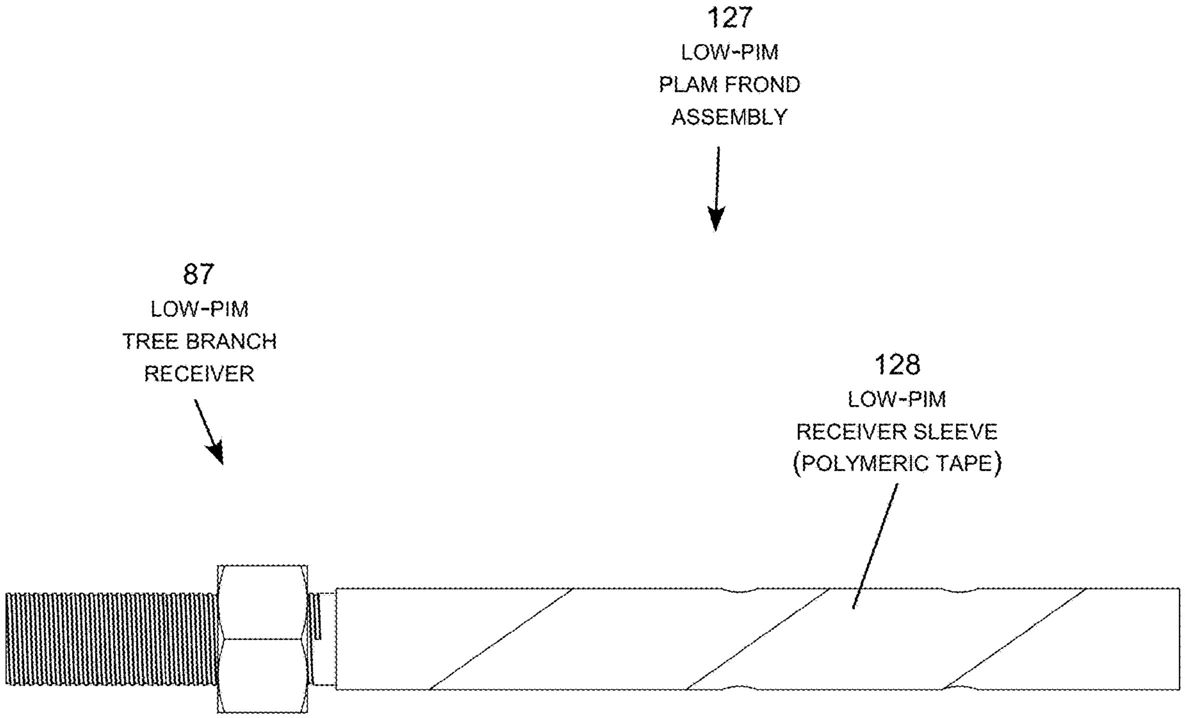
FIG. 14 is a perspective view of an alternative low-PIM frond assembly. with a low-PIM sleeve formed by polymeric tape.

In the representative embodiments, the low-PIM sleeves may be separate polymeric structures held in place by adhesives, heat shrink or other techniques. It will be appreciated, however, that low-PIM sleeves may alternatively be adhered to the metal branch shafts or receivers with other techniques, such as painting, spraying, dipping, powder deposition, taping or any other suitable technique for adhering a nonmetallic (e.g., polymeric) coating to a metal structure. For example, FIG. 13 is a perspective view of an alternative low-PIM tree branch assembly 125 in which a continuous low-PIM receiver sleeve 126 has been applied by painting, spraying, dipping, powder deposition, or any other suitable technique for adhering a nonmetallic (e.g., polymeric) coating to a metal structure. FIG. 14 is a perspective view of an alternative low-PIM tree branch assembly 127 in which the low-PIM sleeve 128 is formed by polymeric tape wrapped around the portion branch receiving portion of the tree branch receiver 87.

In addition, while polymeric materials are inexpensive, easy-to-use low-PIM isolators, other types of nonmetallic materials, such as ceramic, fiber board, bonded cellulose, fabric, various composites, and so forth can be used. In addition, while the illustrative concealment branch have been shown as palm fronds and tree branches (e.g., pine, elm, eucalyptus, etc.) the invention is not limited to these specific types of concealments. In other types of concealments, the branches may be brackets, struts, flanges or other types of connectors used to fasten the concealment to the antenna mounting structures. For example, these concealments may include signs, billboards, light stands, artificial flowers, balloons, painted decorations, and the like.

The representative palm stubs, palm foliage and tree foliage may be fabricated from high-density polyethylene (HDPE), fiber-reinforced polymer (FRP), or another suitable nonmetallic material. The frond shafts and tree branch shafts may be fabricated from galvanized steel, painted steel, electroplated steel, stainless steel, aluminum, titanium, various alloys, or other suitable metals. The frond receivers and tree branch receivers may likewise be fabricated any of these metals. The fasteners may be bolt stacks, retainer pins, rivets, screws, or other suitable fasteners fabricated from any of these metals. Where metal-to-metal contact will occur, the types of metals used to fabricate the contacting metal parts should be the same material or similar on the galvanic scale to avoid galvanic corrosion. For example, galvanized steel pipes should be secured with galvanized bolt stacks to avoid galvanic corrosion.

Figure 15:
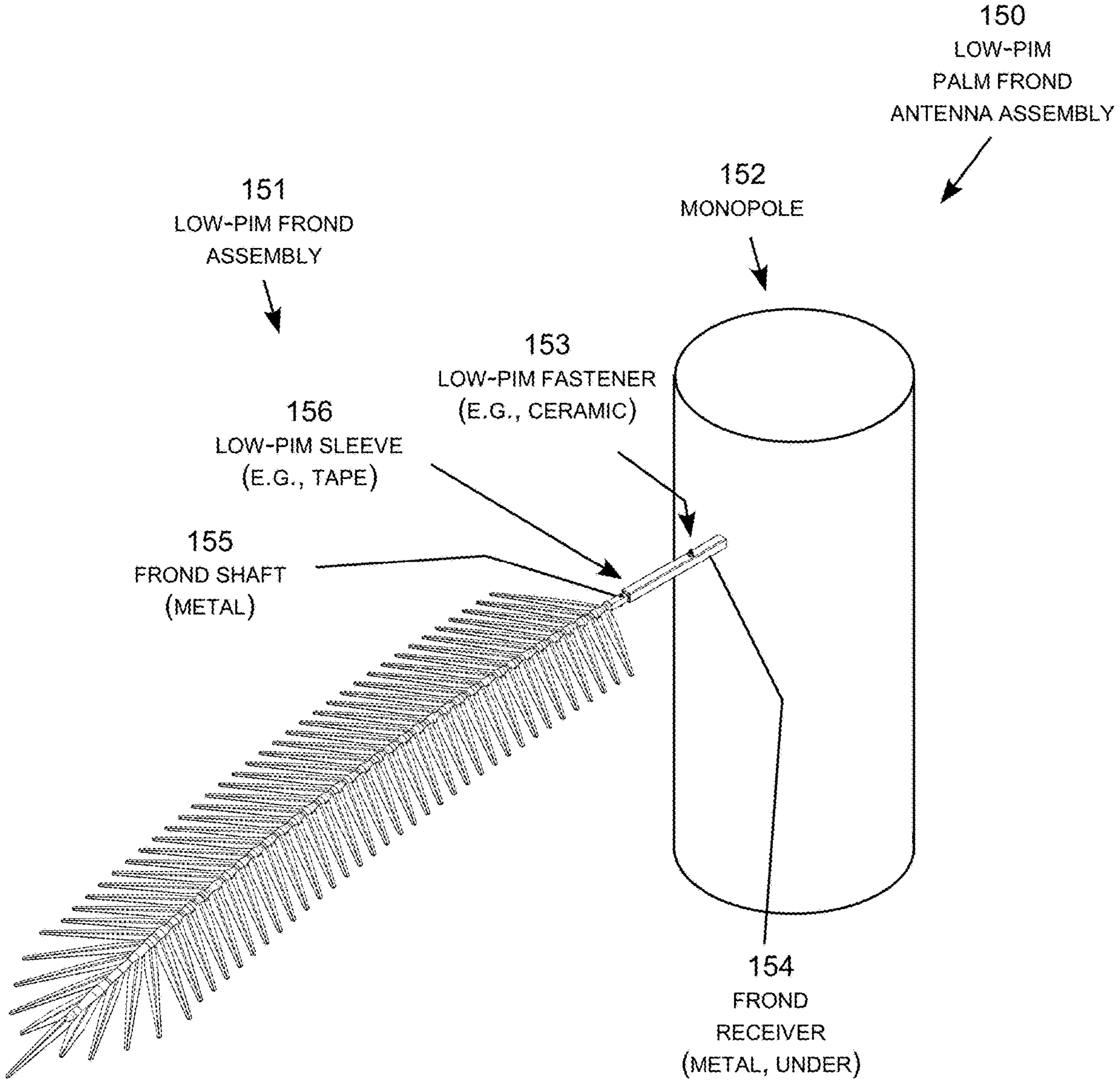
FIG. 15 is a perspective view of an alternative low-PIM frond assembly utilizing low-PIM fasteners.
Figure 16:
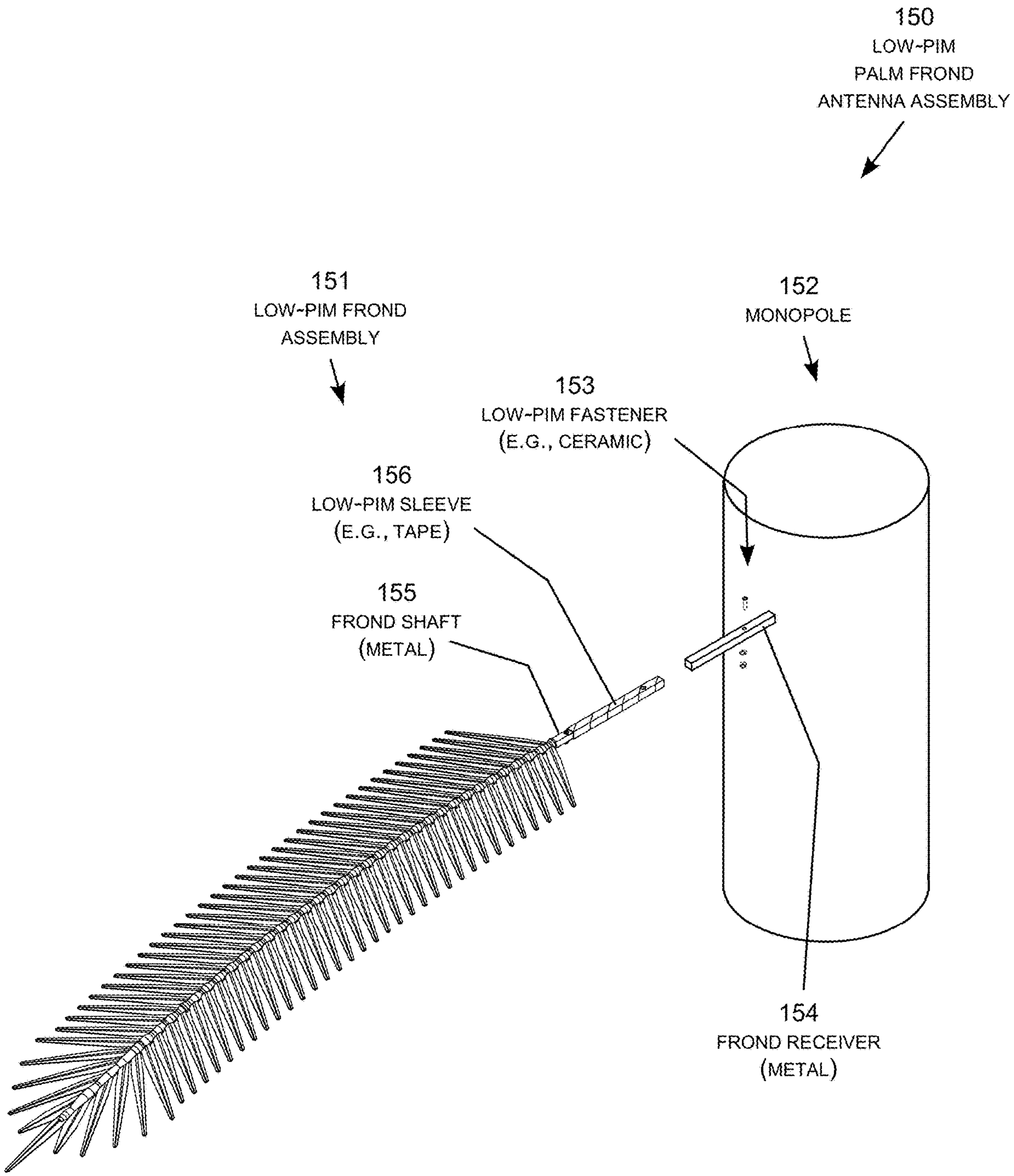
FIG. 16 is a perspective partially exploded view of the low-PIM frond assembly utilizing low-PIM fasteners.
Figure 17:
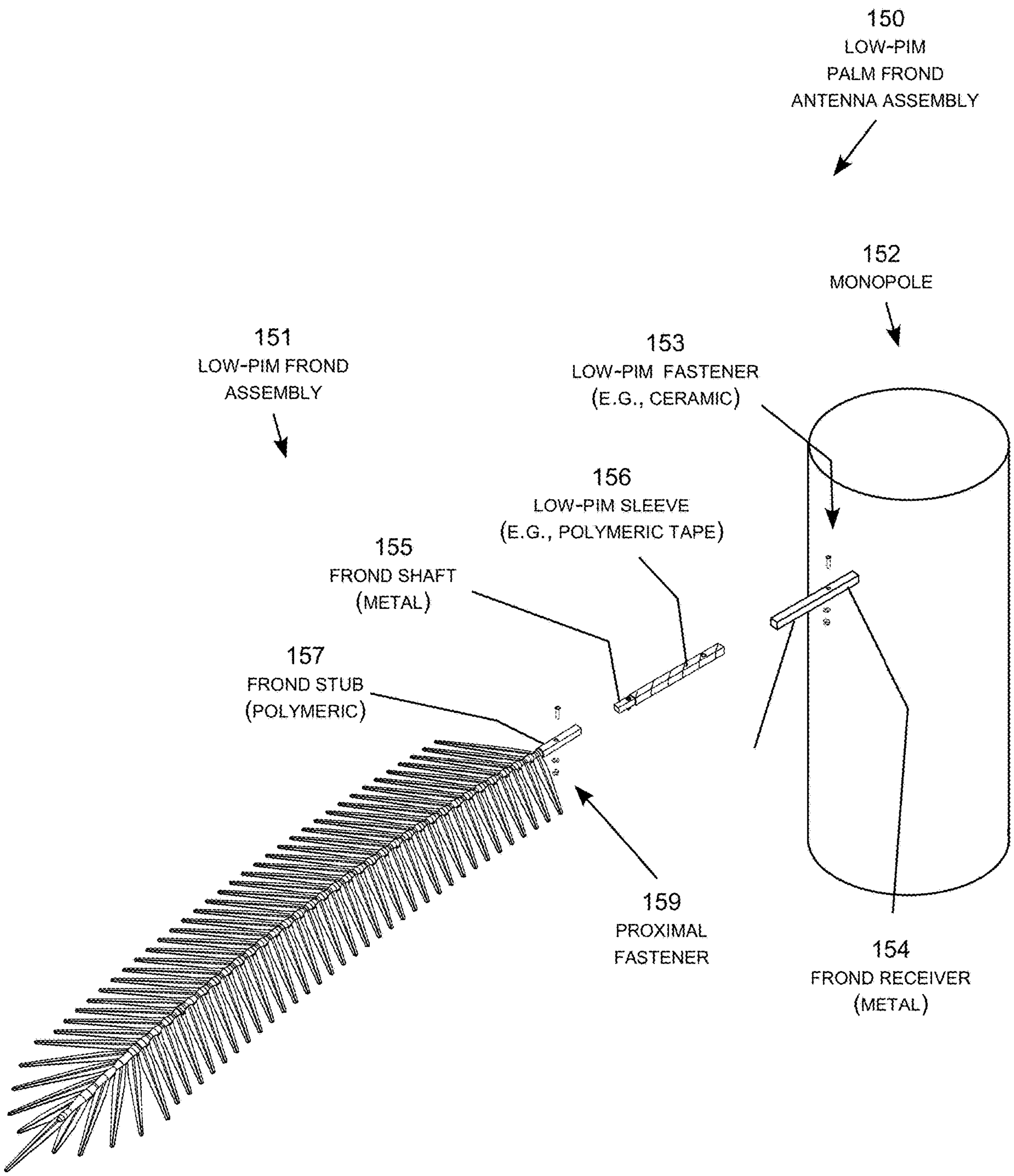
FIG. 17 is a perspective exploded view of the low-PIM frond assembly utilizing low-PIM fasteners.

FIG. 15 is an assembled perspective view, FIG. 16 is a partially exploded perspective view, and FIG. 17 is a more fully exploded perspective view of an alternative low-PIM palm frond antenna assembly 150 including a representative low-PIM frond assembly 151 supported by a monopole 152. The low-PIM frond assembly 151 represents one frond of a low-PIM palm concealment assembly similar to the low-PIM palm concealment assembly 10 shown in FIG. 1 except that, for each frond, the metal distal fastener 29 shown in FIG. 3C is replaced by a low-PIM fastener 153, such as a ceramic, fiberglass, polycarbonate, composite, or other type of low-PIM (e,g, nonmetallic, polymeric fastener. In this embodiment, the low-PIM fastener 153 attaches the metal the metal frond shaft 155 to the metal frond receiver 154, which is typically welded to the typically metal monopole 152. The metal frond shaft 155 is at least partially covered the low-PIM sleeve 156 positioned between the metal frond receiver 154 and the metal frond shaft 155 to avoid PIM generation by loose connection between these components. The low low-PIM fastener 153 adds additional PIM avoidance at the junction between the fastener 153 and the metal frond receiver 154 or the metal frond shaft 155.

Optionally, the proximal fastener 28 shown in FIG. 5B may also have low-PIM construction. Similarly, the first and second distal fasteners 65*a* and 65*b* shown in FIG. 6B may have low-PIM construction. FIG. 17 also shows the typically polymeric frond stub 157 apart from the metallic frond shaft 155, which is covered at least in part by the low-PIM polymeric sleeve 156. FIG. 17 also shows an exploded view of the proximal fastener 159, which may optionally have a low-PIM construction in this embodiment.

The utilization of one or more low-PIM fastener 153, as described above, avoids the potential creation of PIM interference at the connections between the low-PIM fastener 153 and the metal frond receiver 154 or the metal frond shaft 155. As a result, the low-PIM sleeve 156 need not include insulation between the metal frond shaft 155 provided by the fastener channel sections 42*a* and 42*b* shown in FIGS. 4B and 4C. Similarly, replacing the first and second distal fasteners 65*a* and 65*b* with low-PIM fasteners avoids the need for the first and second fastener channels 64A and 64B in the embodiment shown in FIG. 6B. Accordingly, the low-PIM frond assembly 151 exhibits improved PIM avoidance when a PIM sleeve without transverse channels is utilized, such as the low-PIM frond assembly 162 with a continuous (e.g., dipped or sprayed on) polymeric sleeve 163 shown in FIG. 62, or the low-PIM frond assembly 164 with a polymeric tape low-PIM sleeve 165 shown in FIG. 6D.

The low-PIM fastener 153 may be fabricated from a single type of nonmetallic material or multiple nonmetallic materials (e.g., one type of nonmetallic material for the bolt and another type of nonmetallic material for the washer or nut). The low-PIM fastener 153 may also include some portion of metal, such as metal nut lined with a nonmetallic thread insert, a metal bolt coated with a nonmetallic material, and so forth. That is, the low-PIM fastener may be fabricated from one or more nonmetal materials, such as fiberglass, polycarbonate, ceramic, or a nonmetal composite material. Alternatively, the low-PIM fastener may be fabricated from a metal material covered by a nonmetal material to avoid metal-to-metal contact within the fastener. While the figures illustrate bolt-type fasteners, other types of fasteners may be used, such as rivets, screws, pins, cotter pins, clevises and the like.

Figure 18:
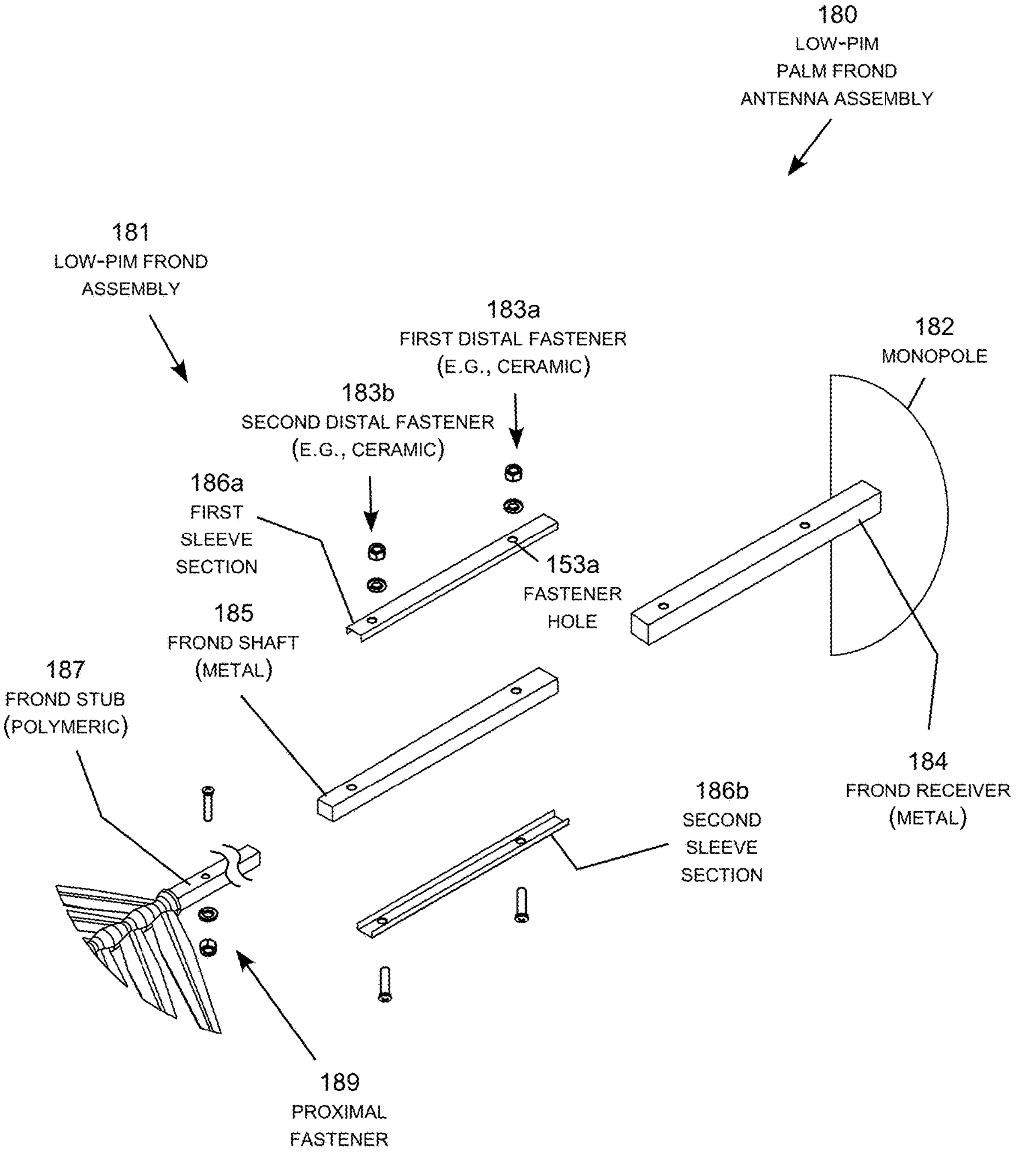
FIG. 18 is a perspective exploded view of an enlarged portion of the low-PIM frond assembly utilizing low-PIM fasteners.

FIG. 18 is a perspective exploded view of an enlarged portion of the low-PIM frond assembly 180 utilizing nonmetallic fasteners including a representative low-PIM frond assembly 181 supported by a monopole 182. Again, the low-PIM frond assembly 181 represents one frond of a low-PIM palm concealment assembly similar to the low-PIM palm concealment assembly 10 shown in FIG. 1 except that, for each frond, the metallic fasteners 65*a*, 65*b* and 66 shown in FIGS. 6A and 6B are replaced by a low-PIM fasteners 183*a*, 183*b* and 189, respectively. In this embodiment, the low-PIM sleeve includes a first upper sleeve section 186*a* and a lower sleeve section 186*b*. As a result of using the low-PIM fasteners (unlike the upper and lower sleeves sections 62*a* and 62*b* shown in FIGS. 6A and 6B), the upper and lower sleeves sections 183*a* and 183*b* in this embodiment do not include low-PIM fastener channels similar to the first and second fastener channels 64*a* and 64*b* shown in FIGS. 6A and 6B. That is, utilization of the low-PIM fasteners 183*a*, 183*b* avoids PIM generation between the metal fasteners and the metal frond shaft 185 obviating the need for low-PIM fastener channels. This embodiment also includes an optional proximal fastener 189. It will be appreciated that a slight adjustment is the length of certain components will allow the proximal fastener 189 to also serve as the second distal low-PIM fastener, obviating the need for the separate second distal low-PIM fastener 183*b* shown in FIG. 18.

Figure 19A:
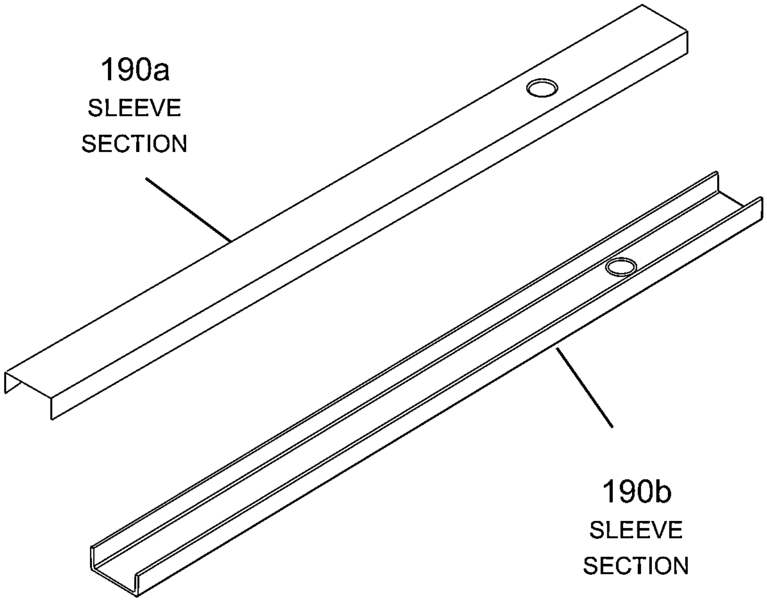
FIGS. 19A-19C are exploded perspective views of alternative low-PIM sleeves for the low-PIM frond assembly utilizing low-PIM fasteners.
Figure 19B:
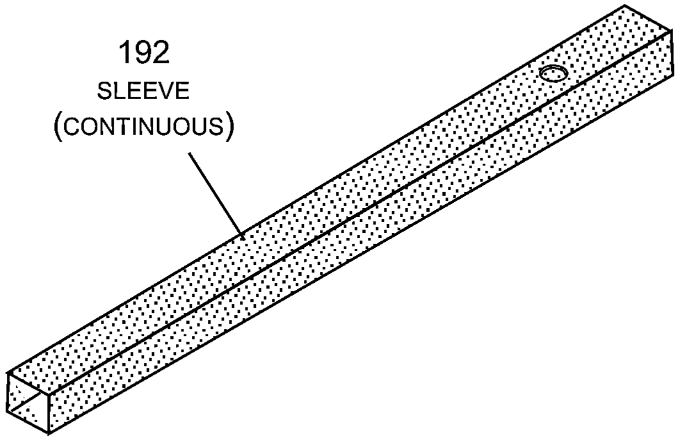
Figure 19C:
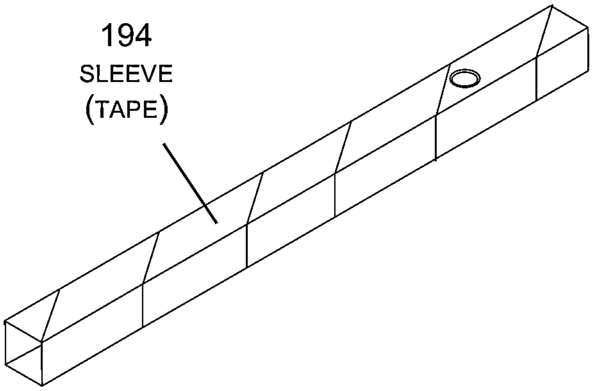

FIGS. 19A-19C are alternative low-PIM sleeves for the low-PIM frond assembly utilizing low-PIM fasteners. These illustrative alternatives include the two-part sleeve 190*a*-190*b* shown in FIG. 19A, the continuous (e.g., dipped, sprayed on) sleeve 192 shown in FIG. 19B, and the polymeric tape sleeve 194 shown in FIG. 19C. Other low-PIM sleeve materials may be utilized as a matter of design choice.

Figure 20:
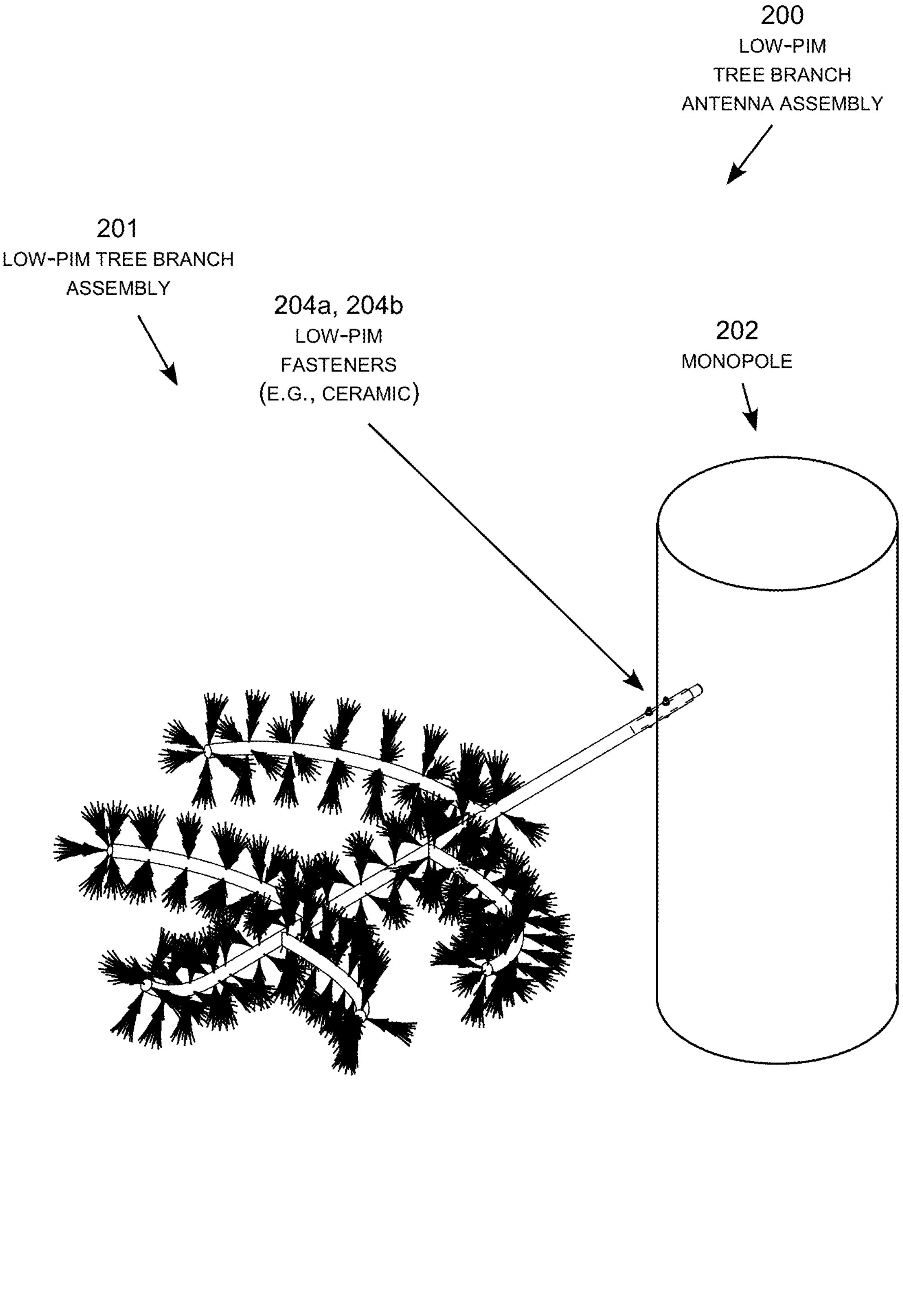
FIG. 20 is a perspective view of an alternative low-PIM tree branch assembly utilizing low-PIM fasteners.
Figure 21:
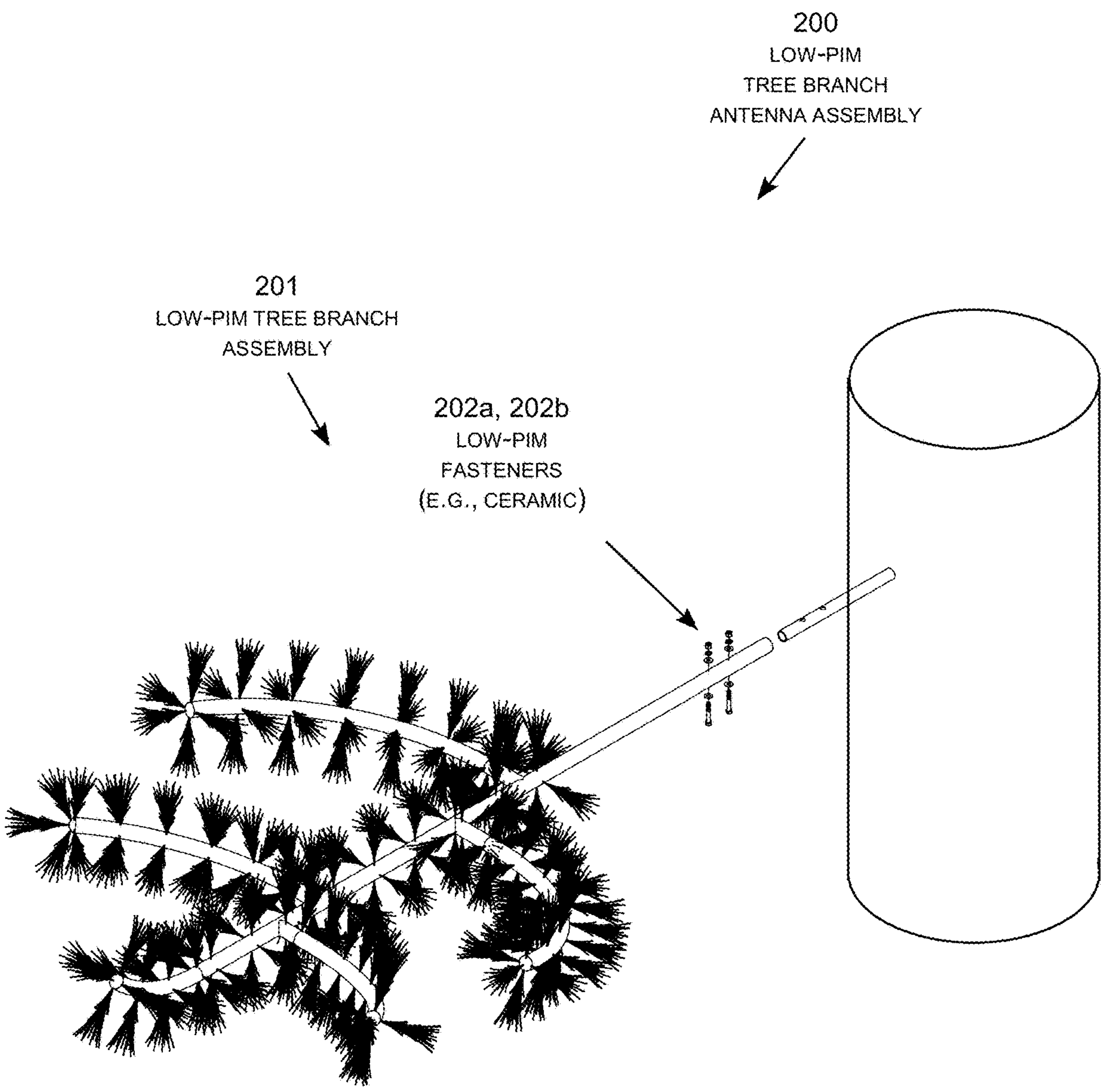
FIG. 21 is a perspective exploded of the alternative low-PIM tree branch assembly utilizing low-PIM fasteners.

FIG. 20 is a perspective assembled view, and FIG. 21 is a perspective exploded view, of an alternative low-PIM tree branch antenna assembly 200 including a low-PIM tree branch assembly 201 utilizing nonmetallic fasteners 202*a* and 202*b*. The low-PIM tree branch assembly 201 represents one tree branch of a low-PIM tree concealment assembly similar to the low-PIM tree concealment assembly 80 shown in FIG. 8 except that, for each tree branch, the metal fasteners 90*a* and 90*b* shown in FIGS. 9A and 9B are replaced by a low-PIM fasteners 202*a* and 202*b*, respectively. In this embodiment, the tree branch shaft 205 is typically fabricated from a nonmetal material, such as fiberglass, allowing the low-PIM fasteners 202*a* and 202*b* to serve as the only low-PIM insulators added to conventional tree branch assemblies to avoid PIM creation in the low-PIM tree branch assembly 200. Those skilled in the art will be enabled to create other types of low-PIM concealments with metal and low-PIM fasteners in various combinations as variations based on the teaching of the present disclosure.

The words “couple,” “adjacent” and similar terms do not necessarily denote direct and immediate connections, but also include connections through intermediate elements or devices. Certain descriptors, such "first" and "second," "top and bottom," "upper" and "lower," "inner" and "outer," "leading" and "trailing, "proximal" and "distal", "vertical" and "horizontal" or similar relative terms may be employed to differentiate structures from each other in representative embodiments shown in the figures. These descriptors are utilized as a matter of descriptive convenience and are not employed to implicitly limit the invention to any particular position or orientation.

It will be understood that specific embodiments may include a variety of features and options in different combinations, as may be desired by different users. Practicing the invention does not require utilization of all, or any particular combination, of these specific features or options. The specific techniques and structures for implementing particular embodiments of the invention and accomplishing the associated advantages will become apparent from the following detailed description of the embodiments and the appended drawings and claims.

The invention claimed is:

1. A low-PIM cellular base-station concealment for a cellular base-station antenna, the concealment comprising a plurality of branches, each branch for connection to a metal branch receiver attached to a mounting structure supporting the cellular base-station antenna, each branch comprising:

a branch shaft;

branch foliage connected to the branch shaft;

at least one low-PIM fastener for connecting the branch shaft to the metal branch receiver wherein each branch comprises a palm frond, the branch foliage comprises palm foliage, the branch shaft comprises a metal frond shaft, and the branch receiver comprises a metal frond receiver;

wherein each branch comprises a palm frond, the branch foliage comprises palm foliage, the branch shaft comprises a metal frond shaft, and the branch receiver comprises a metal frond receiver further comprising a frond stub extending from the palm foliage positioned within the metal frond shaft;

wherein the one or more low-PIM isolators include a polymeric sleeve positioned over the metal frond shaft for receipt within the metal frond receiver to insulate the metal frond shaft from the metal frond receiver.

2. The low-PIM palm concealment of claim 1, wherein the low-PIM sleeve comprises first and second polymeric sleeve sections forming at least one axial seam along the metal frond shaft.

3. The low-PIM palm concealment of claim 1, wherein the low-PIM sleeve comprises a continuous polymeric sleeve.

4. The low-PIM palm concealment of claim 1, wherein the low-PIM sleeve comprises polymeric tape wrapped around the metal frond shaft.

5. The low-PIM palm concealment of claim 1, further comprising a stub fastener extending through the metal frond shaft and the frond stub restraining the frond stub from separating from the metal frond shaft.

6. The low-PIM palm concealment of claim 1, further comprising a low-PIM mesh safety restraint extending over a portion of the metal frond receiver and the metal frond shaft to restrain the palm foliage in the event of breakage of the frond stub.

7. The low-PIM palm concealment of claim 6, further comprising a lanyard to restrain the palm foliage in the event of breakage of the frond stub.

8. The low-PIM cellular base-station concealment of claim 1, wherein the low-PIM fastener is fabricated from fiberglass, polycarbonate, ceramic, or a nonmetal composite material.

9. The low-PIM cellular base-station concealment of claim 1, wherein the low-PIM fastener is fabricated from a metal material covered by a nonmetal material to avoid metal-to-metal contact within the fastener.

10. A low-PIM cellular base-station concealment for a cellular base-station antenna, the concealment comprising a plurality of branches, each branch for connection to a metal branch receiver attached to a mounting structure supporting the cellular base-station antenna, each branch comprising:

a branch shaft;

branch foliage connected to the branch shaft;

at least one low-PIM fastener for connecting the branch shaft to the metal branch receiver wherein each branch comprises a palm frond, the branch foliage comprises palm foliage, the branch shaft comprises a metal frond shaft, and the branch receiver comprises a metal frond receiver;

wherein each branch comprises a tree branch, the branch foliage comprises tree foliage, the branch shaft comprises a tree branch shaft, and the branch receiver comprises a tree branch receiver, further comprising:

a low-PIM tree branch receiver for attachment to the mounting structure and for receiving the branch shaft over the low-PIM tree branch receiver.

11. The low-PIM tree concealment of claim 10, wherein each tree branch receiver comprises a metal rod comprising a threaded end engaged with an anchor nut welded to the mounting structure, and an jamb nut engaged with the threaded end tightened against the anchor nut.

12. The low-PIM cellular base-station concealment of claim 10, wherein the low-PIM fastener is fabricated from fiberglass, polycarbonate, ceramic, or a nonmetal composite material.

13. The low-PIM cellular base-station concealment of claim 10, wherein the low-PIM fastener is fabricated from a metal material covered by a nonmetal material to avoid metal-to-metal contact within the fastener.

14. A cellular base station comprising:

a mounting structure;

a cellular base-station antenna supported by the mounting structure;

a concealment comprising a plurality of branches, each branch for connection to a metal branch receiver attached to a mounting structure supporting the cellular base-station antenna, each branch comprising a branch shaft, branch foliage connected to the branch shaft, at least one low-PIM fastener connecting the branch shaft to the metal branch receiver;

a frond stub extending from the palm foliage positioned within the metal frond shaft;

wherein for each branch, the branch comprises a palm frond, the branch foliage comprises palm foliage, the branch shaft comprises a metal frond shaft, and the branch receiver comprises a metal frond-receiver;

wherein the one or more low-PIM isolators include a polymeric sleeve positioned over the branch shaft for receipt within the metal frond receiver to insulate the metal frond shaft from the metal frond receiver.

15. The low-PIM cellular base-station concealment of claim 14, wherein the low-PIM fastener is fabricated from fiberglass, polycarbonate, ceramic, or a nonmetal composite material.

16. The low-PIM cellular base-station concealment of claim 14, wherein the low-PIM fastener is fabricated from a metal material covered by a nonmetal material to avoid metal-to-metal contact within the fastener.

17. The low-PIM cellular base-station concealment of claim 14, wherein for each respective branch, further comprising a lanyard to restrain each respective branch in the event of breakage of the branch.

18. A cellular base station comprising:

a mounting structure;

a cellular base-station antenna supported by the mounting structure;

a concealment comprising a plurality of branches, each branch for connection to a metal branch receiver attached to a mounting structure supporting the cellular base-station antenna, each branch comprising a branch shaft, branch foliage connected to the branch shaft, at least one low-PIM fastener connecting the branch shaft to the metal branch receiver;

a low-PIM tree branch receiver for attachment to the mounting structure and for receiving the tree branch shaft over the low-PIM tree branch receiver;

wherein each branch comprises a tree branch including branch foliage comprises tree foliage, the branch shaft comprises a tree branch shaft, and the branch receiver comprises a tree branch receiver.

19. The low-PIM cellular base-station concealment of claim 18, wherein the low-PIM fastener is fabricated from fiberglass, polycarbonate, ceramic, or a nonmetal composite material.

20. The low-PIM cellular base-station concealment of claim 18, wherein the low-PIM fastener is fabricated from a metal material covered by a nonmetal material to avoid metal-to-metal contact within the fastener.

21. The low-PIM cellular base-station concealment of claim 18, wherein for each respective branch, further comprising a lanyard to restrain each respective branch in the event of breakage of the branch.

* * * * *